United States Patent
Naik et al.

(10) Patent No.: US 6,690,772 B1
(45) Date of Patent: Feb. 10, 2004

(54) VOICE DIALING USING SPEECH MODELS GENERATED FROM TEXT AND/OR SPEECH

(75) Inventors: Jayant M. Naik, Stamford, CT (US); Kay L. Bechtel, Duncansville, PA (US); William F. Diede, Sea Cliff, NY (US); Eugene Lubchenko, Katonah, NY (US); Scott Alexander McAlily, Langhorne, PA (US); Barry Paul Pershan, Olney, MD (US); John Reformato, East Meadow, NY (US)

(73) Assignee: Verizon Services Corp., Arlington, VA (US)

( * ) Notice: Subject to any disclaimer, the term of this patent is extended or adjusted under 35 U.S.C. 154(b) by 579 days.

(21) Appl. No.: 09/608,884

(22) Filed: Jun. 30, 2000

Related U.S. Application Data

(60) Provisional application No. 60/180,640, filed on Feb. 7, 2000.

(51) Int. Cl.[7] .............................................. H04M 3/42
(52) U.S. Cl. ............................... 379/88.03; 379/88.11; 704/270
(58) Field of Search ........................... 379/67.1, 88.01, 379/88.02, 88.03, 88.11, 88.19, 88.2, 201.01, 207.02, 207.15, 355.06; 704/270, 275

(56) References Cited

U.S. PATENT DOCUMENTS

| | | | | |
|---|---|---|---|---|
| 4,853,953 A | * | 8/1989 | Fujisaki | 379/88.03 |
| 5,165,095 A | * | 11/1992 | Borcherding | 379/88.03 |

(List continued on next page.)

OTHER PUBLICATIONS

Bellcore, GR–1298–CORE, AINGR: Switching Systems, Issue 4, Revision 1, Oct. 1998, pp. 2–4, 3–28, 3–29, 3–30, 3–44, 3–45, 3–46, 3–47, 3–48.

*Primary Examiner*—Scott L. Weaver
(74) *Attorney, Agent, or Firm*—Leonard C. Suchyta, Esq.; Michael P. Straub, Esq.

(57) ABSTRACT

Methods and apparatus for implementing communication services such as voice dialing services are described. In one Centrex based voice dialing embodiment, voice dialing service subscribers are given access to personal voice dialing records including calling entries via the Internet as well as via telephone connections. Each calling entry normally includes the name and, optionally nickname, of a party to be called. It also includes one or more telephone numbers associated with each name. Different telephone number identifies, e.g. locations, can be associated with different names. A user can create or update entries in a voice dialing directory using text conveyed over the Internet or speech supplied via a telephone connection. In order to facilitate updating and maintenance of voice dialing directories over the Internet speaker independent (SI) speech recognition models are used. When a calling entry is created via the Internet the text of the name is processed to generate a corresponding speech recognition model there from. When an entry is created via speech obtained over the telephone, a speech recognition model is generated from the speech and a text name is generated is generated using speech to text technology. To avoid having to hang-up and initiate a new voice dialing call the outcome of a voice dialing call is monitored and the subscriber is provided the opportunity to initiate another call using voice dialing if the first call did not complete successfully e.g., goes unanswered.

28 Claims, 19 Drawing Sheets

U.S. PATENT DOCUMENTS

| | | |
|---|---|---|
| 5,247,571 A | 9/1993 | Kay et al. |
| 5,369,685 A * | 11/1994 | Kero ....................... 379/88.04 |
| 5,404,396 A | 4/1995 | Brennan |
| 5,448,631 A | 9/1995 | Cain |
| 5,638,425 A * | 6/1997 | Meador et al. .......... 379/88.01 |
| 5,717,738 A * | 2/1998 | Gammel .................. 379/88.03 |
| 5,724,481 A * | 3/1998 | Garberg et al. ............. 704/243 |
| 5,832,063 A * | 11/1998 | Vysotsky et al. ........ 379/88.03 |
| 5,844,896 A | 12/1998 | Marks et al. |
| 5,912,949 A * | 6/1999 | Chan et al. ............... 379/88.03 |
| 5,924,070 A * | 7/1999 | Ittycheriah et al. ......... 704/275 |
| 5,958,016 A | 9/1999 | Chang et al. |
| 5,991,364 A | 11/1999 | McAllister et al. |
| 6,018,568 A * | 1/2000 | Furman et al. .......... 379/93.15 |
| 6,049,594 A * | 4/2000 | Furman et al. ............ 379/67.1 |
| 6,094,632 A * | 7/2000 | Hattori ....................... 704/239 |
| 6,163,596 A * | 12/2000 | Gelfer et al. .............. 379/67.1 |
| 6,462,616 B1 | 10/2002 | Beswick et al. |

* cited by examiner

VOICE DIALING USING SPEECH MODELS GENERATED FROM TEXT AND/OR SPEECH

RELATED APPLICATIONS

This application claims the benefit of U.S. Provisional Application Ser. No. 60/180,640 filed Feb. 7, 2000.

FIELD OF THE INVENTION

The present invention is directed to communications systems and, more particularly, to methods and apparatus for providing voice dialing services.

BACKGROUND OF THE INVENTION

Telephones, both mobile and land based, are a frequently used communications tool of modern society. While basic telephone service has remained generally unchanged in terms of its features for years, there is an ever increasing demand for new telephone services.

The demand for new telephone services is prompted by a desire to render telephones easier to use and/or desires to make them more efficient communication tools. The demand for new telephone services is also fueled by the desire of individual telephone companies to; distinguish the services they offer from those of their competitors; create new revenue sources; and/or expand existing revenue sources.

In order to provide enhanced telephone services, many telephone companies now implement a telephone communications network as an Advanced Intelligent Network (AIN) which has made it easier to provide a wide array of previously unavailable voice grade telephone service features. In an AIN system, telephone central offices, each of which serves as a signal switching point (SSP), detect one of a number of call processing events identified as AIN "triggers". An SSP which detects a trigger suspends processing of the call which activated the trigger, compiles a call data message and forwards that message via a common channel interoffice signaling (CCIS) link to a database system, such as a Service Control Point (SCP). The SCP may be implemented as part of an integrated service control point (ISCP). If needed, the SCP can instruct the central office (SSP) at which the AIN trigger was activated to obtain and forward additional information, e.g., information relating to the call. Once sufficient information about the call has reached the ISCP, the ISCP accesses stored call processing information or records (CPRs) to generate from the received message data, a call control message. The call control message is then used to instruct the central office on how to process the call which activated the AIN trigger. As part of the call control message, an ISCP can instruct the central office to send the call to an outside resource, such as an intelligent peripheral (IP) using a send to outside resource (STOR) instruction. IPs are frequently coupled to SSPs to provide message announcement capabilities, voice recognition capabilities and other functionality which is not normally provided by the central office. The control message is normally communicated from the ISCP to the SSP handling the call via the CCIS link. Once received, the SCP completes the call in accordance with the instructions received in the control message.

One service which can be implemented with AIN functionality is Wide Area Centrex. Centrex takes a group of normal telephone lines and provides call processing to add business features to the otherwise standard telephone lines. For example, Centrex adds intercom capabilities to the lines of a specified business group so that a business customer can dial other stations within the same group, e.g., lines belong to the same company, using extension numbers such as a two, three, or four digit numbers, instead of the full telephone number associated with each called line. Other examples of Centrex service features include call transfer between users at different stations of a business group and a number of varieties of call forwarding. Thus, Centrex adds a bundle of business features on top of standard telephone line features without requiring special equipment, e.g., a private branch exchange (PBX) at the customer's premises. U.S. Pat. No. 5,247,571, which is hereby expressly incorporated by reference, describes in detail a Wide Area Centrex system implemented using AIN techniques.

Voice dialing is a useful service which has been implemented in some known systems by having control logic in a telephone switch connect a caller to a voice dialing IP which provides the voice dialing service. The telephone switch may couple the subscriber to the voice dialing IP as a result of the subscriber calling a telephone number corresponding to the IP or entering a code which is detected by the switch. Such known voice dialing systems are not AIN based and therefore are somewhat limited in terms of the logic and information available for controlling connections to voice dialing apparatus, e.g., voice dialing IPs. Thus, the known techniques of using logic embedded in a switch to determine when and to which voice dialing IP a caller should be connected can lead to inefficient using of voice dialing IP resources and limit the ability of known voice dialing services to be implemented as an integral part of other services, e.g., Centrex Services.

Voice dialing is a particularly desirable service since it eliminates the requirement that a user of the voice dialing service remember the telephone number of the party being called. In various known voice dialing systems, speaker dependent speech recognition is used to identify spoken names. In such systems, a personal dialing directory is maintained for each subscriber of the voice dialing system. The personal dialing directory is a database which includes a speaker dependent speech recognition template for each of a plurality of names which may be spoken and a telephone number for each name. When used, the data, e.g., templates in a subscriber's directory, are retrieved; a speaker dependent speech recognition operation is performed on a spoken name provided by the subscriber; and then, assuming a name is recognized, the call is completed to the telephone number in the subscriber's personal dialing directory corresponding to the name. An IP may be used for performing the speech recognition and various other tasks associated with the known voice dialing operation. One particular system for implementing voice dialing is described in detail in U.S. Pat. No. 5,832,063.

While voice dialing systems which use speaker dependent speech recognition to identify spoken names enjoy a high degree of recognition accuracy, they have the disadvantage of requiring that a user of the system provide one or more utterances of each name for which speaker dependent speech recognition templates are to be generated. Thus, a voice signal, e.g., voice telephone connection, is normally required when adding or updating names in a personal dialing directory. In addition, the need to provide multiple utterances of each name in the personal dialing directory can prove irritating to some customers.

In an attempt to make services provided using AIN techniques easier to manage, management of AIN services such as, e.g., call forwarding, via a personal computer and the Internet have been suggested. U.S. Pat. No. 5,958,016, which is hereby expressly incorporated by reference, describes a system wherein a web page type interface is provided, which allows a subscriber access to control and reporting functionalities of an AIN system via the Internet.

Unfortunately, the use of speaker dependent speech recognition templates, with the corresponding need for multiple speech samples to train each name in a personal dialing directory, has made Internet based management of existing voice dialing systems of the type described above difficult to implement.

While existing Centrex and voice dialing services are useful, it is desirable that such services continue to be improved and enhanced. With regard to voice dialing, it is desirable that new methods and apparatus be devised which would allow for Internet based management of voice dialing services. It is also desirable that new methods of providing voice dialing services be devised which will allow voice dialing services to be implemented as part of AIN based service packages such a Centrex. With regard to Centrex, it is desirable that Centrex service be enhanced to support voice dialing functionality as well as Internet based management of said functionality.

SUMMARY OF THE INVENTION

The present invention is directed to methods and apparatus which can be used to provide voice dialing, enhanced Centrex, and other communications services. In various embodiments, the communications services of the present invention are implemented to facilitate easy management of the services by end users via the Internet. In accordance with one feature of the present invention, voice dialing is implemented as an AIN based service. By implementing voice dialing as an AIN based service, the service can be easily integrated with Centrex and/or other AIN based services. In addition, since control logic in an ISCP is used to control access to voice dialing hardware, in response to activation of one or more AIN triggers set telephone switches, access to voice dialing hardware can be controlled to provide efficient use of the voice dialing hardware regardless of the location from which a voice dialing service subscriber calls. In addition, ISCP logic can translate multiple identifiers, e.g., various telephone numbers, associated with a subscriber, into a single user identifier which can be used by voice dialing hardware for subscriber information retrieval purposes.

In accordance with an exemplary voice dialing embodiment of the present invention, each subscriber is able to maintain and update a voice dialing record, used to provide voice dialing services via the Internet. The subscriber's voice dialing record, sometimes refereed to as a voice dialing directory, may include such information as a user identifier, e.g., a Centrex telephone number associated with the subscriber, a mobile telephone number associated with the subscriber, an additional telephone number used by the subscriber, information on one or more individuals or parties to be called and, optionally, information identifying a corporate voice dialing record to be used if a spoken name or nickname is not found using speech recognition models included in the subscriber's voice dialing record.

In accordance with the present invention, a voice dialing call may be placed to an individual or party by speaking either the name or a nickname of the individual or party being called. In addition, if desired, a location associated with the party or individual may also be specified in addition to the party or individuals name. When a location is stated in conjunction with a name, the call will be placed to the party or individual at the particular specified location.

To support such voice dialing functionality, a voice dialing record is maintained for each subscriber. Information relating to each party or individual who may be called is stored within the subscriber's voice dialing record in the form of a calling entry. The subscriber is responsible for providing and updating the information included in each calling entry. A calling entry normally includes the name of the party or individual who may be called, an optional nickname for the party, and a first telephone number associated with the named party or individual. Optionally one or more additional phone numbers may be associated in the calling entry with the named party or individual. When multiple telephone numbers are associated with a named party or individual, a telephone number identifier, e.g., the name of a location, is normally associated in the calling entry with each telephone number. Examples of telephone number identifiers which may be associated with a telephone number include, for example: Home, Office, Office 2, Mobile, Secretary, etc. In some embodiments the subscriber is allowed to define telephone number identifiers. For example, the subscriber may associate the identifier "girl friend 2" with the telephone number of a second girl friend.

A subscriber's voice dialing record is stored in part of the public telephone system in accordance with the present invention, e.g., in an intelligent peripheral device, e.g., voice dialing (VD) IP, coupled to a central office telephone switch. In addition to being coupled to the telephone network via the central office switch, the VD IP is coupled to the Internet via one or more servers. Various security measures are taken, including the use of a PIN, to insure that unauthorized individuals, e.g., non-subscriber's, are not given access via the Internet, to subscriber's voice dialing records. Alternatively, a customized desk top application, as opposed to a Web Browser, can be used to access and update a subscriber's voice dialing record information via the Internet. Given that the VD IP is coupled to both the telephone network and the Internet, two methods of accessing a subscriber's records are possible.

To provide a subscriber with the greatest flexibility with regard to maintaining and updating his/her voice dialing directory, a subscriber is provided the opportunity to update the subscriber's voice dialing directory by telephone using voice/DTMF input and, alternatively, though an Internet connection. A Web browser such as Internet Explorer, operating on a subscriber's computer can be used to display voice dialing record information and for providing updated information, e.g., in the form of text input, to the VD IP in which the subscriber's voice dialing record is stored.

In addition to the calling record, e.g., calling entry information discussed above, which is provided by the subscriber, each subscriber's calling record normally further comprises a speech recognition model for each name and nickname included in the subscriber's record. The use of speaker dependent speech recognition models for the recognition of one or more names included in a voice dialing record is contemplated and possible. However, in order to implement a voice dialing system that is easy to update and maintain via text obtained from the Internet, speaker independent speech recognition models are used for most, if not all, names and nicknames included in a subscriber's voice dialing record. The speech recognition models for names entered via the Internet are generated from the text of the name using speaker independent modeling techniques. This generally involves performing a text to phoneme conversion operation. It also involves generating a speaker independent speech recognition model from the phonemes produced from the text of the name or nickname being processed.

Speaker independent speech recognition models produced from text work well for most names. However, in some cases where the pronunciation of a name is difficult to predict from its spelling, e.g., due to a variety of possible pronunciations or because it originates from a foreign language name, a speaker independent speech recognition model produced from text may provide recognition results which are less than satisfactory.

In order to address this potential problem, the methods and apparatus of the present invention allow for a subscriber to provide one or more speech samples of a name to be used for generating a speech recognition model for voice dialing purposes. The speech corresponding to a name may be provided as part of a telephone based voice dialing entry creation or updating process. In the case where an existing entry is being updated using a spoken version of a name, a speaker independent (or, optionally speaker dependent) speech recognition model is generated from the speech corresponding to the name. The generated speech recognition model is stored in place of a speech recognition model previously generated from text when such a text based model exists.

In the case where speech corresponding to a name is being used to create a voice dialing entry, as opposed to update an existing entry, the speech corresponding to the name is used to generate a speech recognition model. A speech recognition operation is also performed on the speech and a text version of the spoken name is generated and used to populate the (text) name portion of the calling entry corresponding to the spoken name. The text name entry is displayed to a user accessing the calling entry information via the Internet. A user can edit, via the Internet, the spelling of the name in the entry if desired without affecting the speech recognition model generated from the supplied speech.

To distinguish between speech recognition models generated from speech and those generated from text, model type information, e.g., identifying whether the model was generated from text or speech, may be stored in conjunction with the speech recognition models included in a voice dialing directory. In one particular embodiment, altering of the text version of a name normally does not affect the corresponding speech model when the model was generated from speech. However, in such an embodiment altering of the text version of a name does cause updating of the speech model when the model is generated from text.

As a result of the above discussed model generation processes, a subscriber's voice dialing record may include name speech recognition models generated from text as well as ones generated from speech samples.

The information in a subscriber's voice dialing record is used by the voice dialing IP to initiate calls in response to a subscriber's speech. As part of a voice dialing operation information from a subscriber's voice dialing record is retrieved from memory using a user, e.g., subscriber, ID to identify the subscriber record. In one embodiment, the subscriber's Centrex telephone number is used as the User ID. Thus, in cases where the subscriber attempts to place a call using speech from his/her Centrex phone line, the subscriber's ID can be obtained using automatic number identification,(ANI) techniques.

In order to allow a subscriber to call from any one of a plurality of telephones various procedures for identifying the caller and providing the voice dialing IP with the subscriber's ID are supported. Accordingly, a voice dialing service subscriber using a mobile phone, phone associated in the customer record with the subscriber, or another phone, can be coupled to the voice dialing IP where his/her voice dialing record is accessible and obtain a voice dialing service there from. In most cases where the subscriber initiates a voice dialing call from a phone line other than his/her Centrex line, the telephone number from which the person is calling is identified and cross-referenced with stored information associating the identified phone number, e.g., mobile number, with a Centrex telephone number. In cases where the subscriber is calling from a number for which there is no stored information associating the phone number with a Centrex phone number, the caller is requested to supply his/her Centrex telephone number. An integrated service control point (ISCP), accessed in response to activation of an AIN trigger, may be used for associating telephone numbers from which a subscriber is calling with his/her Centrex number which is used as the user ID supplied to the voice dialing IP.

The voice dialing IP receives from the subscriber speech which is to be used to place a voice dialing call. The speech may include the name or nickname of a person to be called. It can also include a location associated with the name or nickname of the person or party to be called.

Upon recognizing a name in received speech, the voice dialing IP plays the voice dialing subscriber a confirmation message such as, e.g., "Dialing John Smith" where "John Smith" is the recognized name. This provides the subscriber the opportunity to stop the call in the event a recognition error occurred, e.g., by hanging up or otherwise signaling the voice dialing IP. A voice recording of the recognized name may be played to the subscriber as part of the confirmation message, e.g., recording of the subscriber's voice obtained at the time the subscriber trained a speech recognition model in his/her voice dialing directory using speech. However, in accordance with one feature of the present invention, a text representation audio corresponding to a recognized name is generated for message confirmation purposes from a stored text version of the name. In such an embodiment, a text to speech circuit is used to generate an audio version of a name from a stored text version when an audio version of the name is needed for a confirmation message. Since storage of text is much more efficient than the storage of voice recordings, the use of text versions of names for confirmation message purposes can be considerably more efficient from a memory perspective than the use of audio recordings.

In response to recognizing a name or nickname but not a location in speech, the voice dialing IP provides to the telephone switch to which it is coupled the default, e.g., first, telephone number, in the subscriber's voice dialing record, corresponding to the identified name or nickname. If a location is recognized in the received speech, in addition to a name or nickname, the telephone number corresponding to the name or nickname, and the detected location is supplied to the telephone switch. After supplying the called party telephone number information to the switch and playing the subscriber an audio confirmation messaged including at least a portion of the recognized name, the audio connection between the voice dialing IP and the caller is terminated freeing the voice dialing IP resources to be used to service other subscribers. The telephone number supplied by the VD IP to the telephone switch is used by the switch to place a call to the specified number.

In accordance with one embodiment of the present invention, the results of a voice dialing operation are monitored to detect various potential call outcomes. That is, a determination is made as to whether or not a busy signal is encountered, the called party does not answer, or if the call is successfully completed to the destination number (e.g. whether the called party answers the call).

If a no answer or busy signal condition is detected, a service control point (SCP) associated with the voice dialing subscriber is contacted for call processing instructions. In various embodiments, the SCP is implemented as an integrated service control point (ISCP). The contacted SCP then causes the subscriber to be reconnected to the VD IP. The VD IP informs the caller via an audio message of the call outcome and offers the caller the opportunity to place another voice dialing call if desired.

Thus, the present invention provides a voice dialing subscriber the opportunity to place multiple sequential voice dialing calls without having to hang-up when a busy signal or no answer condition is encountered. Because the voice dialing IP is disconnected from the caller between voice dialing call attempts, voice dialing and speech recognition resources are used in an efficient manner and are not tied up during the time required to detect the outcome of a call.

Various additional features and advantages of the present invention will be apparent from the detailed description which follows.

DETAILED DESCRIPTION

As discussed above, the present invention is directed to methods and apparatus for providing voice dialing services. The voice dialing services may be provided as a stand-alone service, as part of a Centrex service, or as part of another telephone service package. As will be discussed in detail below, in accordance with one feature of the present invention, individuals can update voice dialing directories maintained as part of a voice dialing service via the Internet and/or through use of their telephones.

Figure 1:
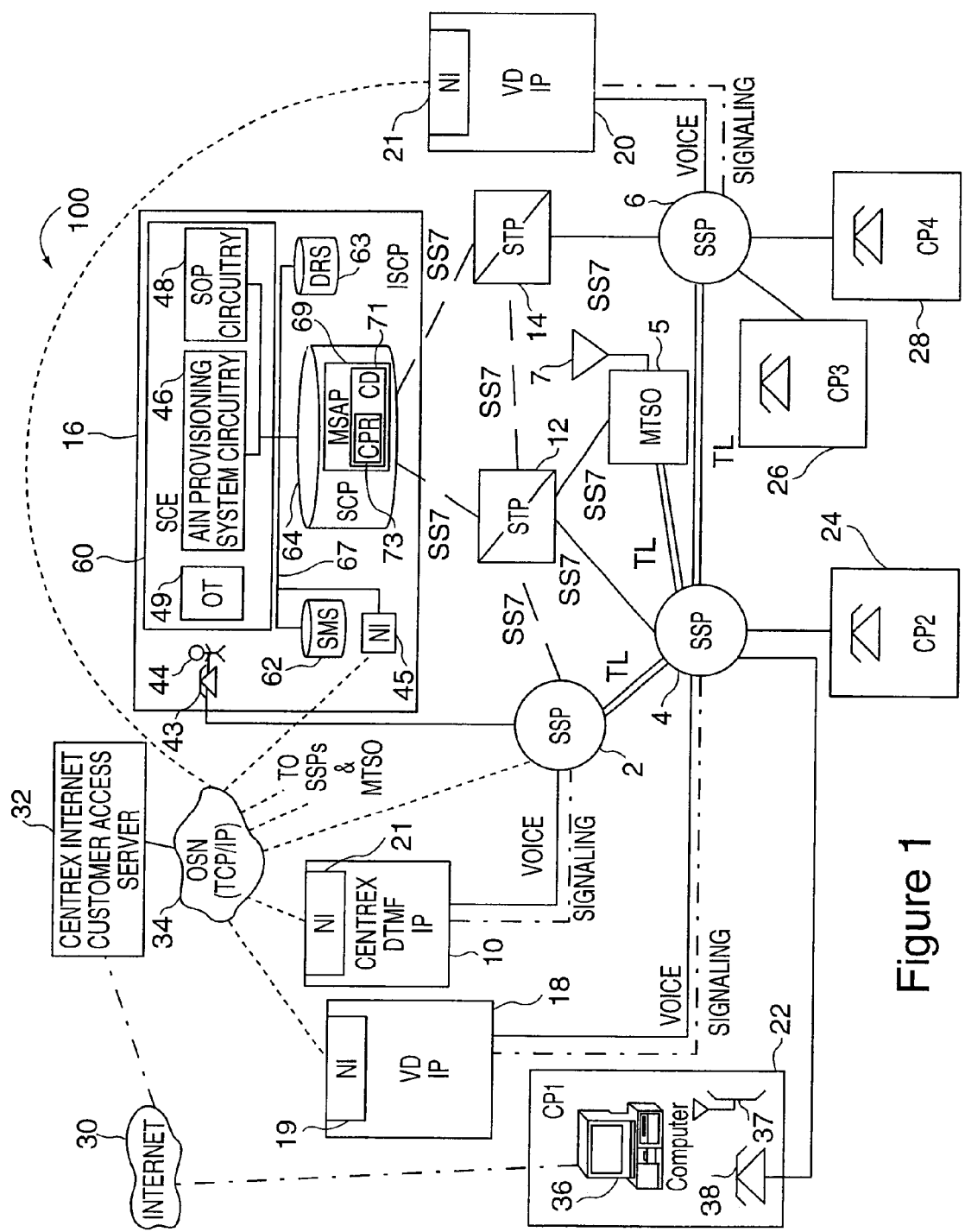
FIG. 1 illustrates a communication system implemented in accordance with an exemplary embodiment of the present invention.

FIG. 1 illustrates a communication system 100 implemented in accordance with an exemplary embodiment of the present invention. The system 100 supports communications via the Internet 30, as well as the public telephone switching network (PTSN). The PTSN includes a plurality of signal switching points (SSPs) 2, 4, 6 which, as is known in the art, may be implemented using known Class V telecommunications switches capable of supporting the signaling system seven (SS7) protocol. Each SSP 2, 4, 6 may correspond to a different telephone central office. Trunk lines (TL), which may comprise, e.g., one or more T1 lines, interconnect the various SSPs 2, 4, 6. In addition to SSPs 2, 4, 6, the system 100 includes a mobile telephone switching office (MTSO) 5 for servicing mobile telephone calls. The calls may be received via antenna 7. The MTSO 5 is coupled to one or more SSPs, e.g., SSP,4 via trunk lines. In this manner, cellular telephone calls can be routed and processed via an SSP 4 allowing interaction with land line telephones as is known in the art.

Each SSP 2, 4, 6 is normally connected to one or more customer premises (CP) which may include, e.g., Centrex subscriber residences and/or offices as well as the residences and offices of non-Centrex subscribers. In the FIG. 1 example, first and second customer premises 22 and 24 are coupled to the second SSP 4, while third and fourth customer premises 26, 28 are coupled to the third SSP 6. Connections between the SSPs and CPs may be by POTS lines, ISDN lines, DSL, or other known communications lines.

Communications equipment, referred to as customer premise equipment (CPE) is located at each customer premises 22, 24, 26, 28. Customer premise equipment may include, e.g., telephones, faxes, computers, etc. In FIG. 1, a computer 36, land-line telephone 38, and mobile telephone 37 are shown as being located at the first customer premises 22. As will be discussed below, each of these devices corresponds in the exemplary embodiment shown in FIG. 1 to a first Centrex service subscriber. Since cell phone 37 is a mobile communications device it need not be physically located at the first customer premises to operate. The computer 36, located at the first customer premises 22 is coupled by any one of a plurality of known connection techniques, e.g., telephone dial-up, ISDN, DSL, etc., to the Internet 30, also known as the World Wide Web.

While the second, third and fourth customer premises 26, 28 are illustrated as including only landline phones, it is to be understood that they may have any number of communications devices including, e.g., telephone, fax, and computer devices. For purposes of explanation, it will be assumed that the second customer premises 24, represents the business office of the first Centrex service subscriber while the first customer premises 22 represents the residence (home) of the first Centrex service subscriber. Additional Centrex service subscribers may be coupled to anyone of the SSPs 2, 4, 6.

The system 100 is implemented using AIN techniques. Accordingly, the processing of calls directed to a customer's telephone line and received by an SSP from a telephone customer's line may be controlled by instructions included in customer call processing records (CPRs). In the system 100, the CPRs are stored at an Integrated Services Control Point (ISCP) 16. At least one CPR exists for each Centrex service subscriber. A customer's CPR is accessed in response to activation of an AIN trigger set at, e.g., the SSP 2, 4, or 6 to which the subscriber's lines are connected, e.g., by POTS lines.

The ISCP 16 includes an SCP 64, a service management system (SMS) 62, data and reporting system (DRS) 63, service creation environment (SCE) 60, and a network interface (NI) 45. A local network 67 couples the various components of the ISCP 16 together.

The network interface 45 couples the ISCP 16 to various other components of the telephone network 100 via a TCP/IP based network referred to as an operational services network (OSN) 34. The OSN 34 interconnects SSPs 2, 3, 6, the MTSO 5, Intelligent Peripherals (IPs) 18, 10, 20, and the ISCP 16. Thus, the OSN 34 is a network over which control and signaling information can be passed between the various system components, e.g., using TCP/IP. In addition to being connected to the OSN 34, ISCP 16 is connected, via its SCP 64, to the SSPs and MTSO via one or more signal transfer points (STPs) 12, 14 and Signaling System Seven (SS7) interconnects over which messages, data, and requests for call processing control instructions can be communicated between the SSPs 2, 4, 6, or MTSO 5 and ISCP 16 in accordance with the SS7 protocol.

The SCP 64 includes a multi-service application platform (MSAP) database 69 which includes customer data (CD) 71 for each of a plurality of Centrex and/or other service subscribers. The customer data 71 includes, for each customer: 1) a list of the services to which the customer subscribes; 2) a password which may be input via DTMF signals; and 3) a call processing record (CPR) which is used to instruct an SSP how to process a call in response to an AIN trigger to thereby implement the services to which the customer subscribes. Exemplary services which may be supported by the ISCP 16 include, e.g., voice dialing, call forwarding, call screening, voice mail and a host of other services which may be provided to Centrex subscribers as well as non-Centrex telephone customers.

For purposes of explaining the voice dialing features of the present invention, voice dialing services will be described in the context of a Centrex environment. However, it is to be understood that the voice dialing service of the present invention can be provided outside the Centrex environment, i.e., voice dialing services can be provided to non-Centrex telephone customers as well as Centrex service subscribers.

The customer data 71 which includes call processing records 73 is generated, at least initially, by the SCE 60 in response to input received from a service representative or operator 44. Customer data in the database 71 may, after initial provisioning of a service for a customer, the CPR may be updated by the customer via the Internet and the use of a Web browser.

The SCE 60 includes an operator terminal (OT) 49, service order processing circuitry 48 and AIN provisioning system circuitry 46. The operator terminal 49 is used by the service representative 44 to enter service information, e.g., to create a Centrex account for a new subscriber. The entered data may be information, e.g., relating to the addition of a new Centrex customer, the adding of a service for an existing customer, and/or the cancellation of a service being provided to an existing customer. The service order processing circuitry 48 is used to generate service orders, e.g., orders to add or cancel a service, in response to service information entered into the operator terminal 49. The AIN provisioning system circuitry 46 is responsible for setting and/or updating AIN triggers at the various signal switching points (SSPs and MTSO) required to implemented a service order generated by the service order processing circuitry 48. In addition to setting AIN triggers, the AIN provisioning system circuitry 46 is responsible for generating and/or updating customer data, e.g., call processing records 73, and other information stored in various locations in the system 100, as required to implement a service order. As will be discussed below, various IPs 10, 18, 20 are used to provide services to Centrex and other telephone service subscribers. Thus, in addition to updating information in the customer database 71, the AIN provisioning system circuitry is responsible for updating information in the various IPs 10, 18, and 20. The updating of the IPs and the setting of AIN triggers can be performed by the AIN provisioning system circuitry 46 through communications with the various system components conducted using the OSN 34 and/or via 557 links.

Once service to a customer has been initially configured by a service representative 44, a Centrex service subscriber can, in accordance with the present invention, update various service information though the use of a personal computer and a Web Browser application, various known browsers include Internet Explorer and Netscape. In the FIG. 1 system, the service subscriber to whom the first customer premises 22 corresponds can update the subscriber's Centrex information via the use of computer 36 and an Internet connection.

The system 100 includes a Centrex Internet Customer Access Server (ICAS) 32 which is implemented in accordance with the present invention. The server 32 serves as a secure gateway via which Centrex subscribers can update and configure their Centrex telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or IP 18, 10, 20, coupled to the OSN 34.

In order to implement various services, such as voice dialing and telephone access to Centrex customer service information, first, second and third IPs 10, 18, 20 are used. The first IP 10 is a DTMF IP which is capable of performing speech recognition and DTMF signal detection operations as well as playing voice prompts and other messages to a Centrex customer.

DTMF IP 10 is coupled to the first SSP 2 via audio (voice) and signaling lines. It is also coupled to the OSN though a network interface (NI) 21. In this manner, the DTMF IP 10 can interact with other components of the system 100, e.g., ISCP 16, via communications transmitted over OSN 34 or through the SSP 2. The DTMF IP 10 may be implemented using known hardware. Accordingly, the hardware used to implement DTMF IP 10 will not be described in detail.

The DTMF IP 10 serves as a platform by which a Centrex service subscriber can update his/her service information, e.g., voice dialing directory information, through a telephone as opposed to an Internet connection. A Centrex service subscriber can establish a service updating or management session with the DTMF IP 10, by dialing a telephone number associated with the DTMF IP 10. Dialing of the DTMF's telephone number results in the subscriber's call being routed to SSP 2 and a voice/DTMF connection to the DTMF IP being established.

DTMF IP 10 includes various security features, e.g., customer identification and password entry requirements, as does the CICAS 32, to insure that Centrex customers are limited to accessing and updating there own service records and not those of other Centrex service subscribers.

The second and third IPs 18 and 20 are voice dialing (VD) IPs which are dedicated to supporting voice dialing services in accordance with the present invention. Each of the voice dialing IP's includes a network interface 19, 21 which couples the VD IPs to the OSN 34. The VD IP's are also coupled to the second and third SSPs 4, 6, respectively, via voice and signaling links. An exemplary VD IP will be discussed in greater detail below with regard to FIGS. 3 and 4.

Figure 2:
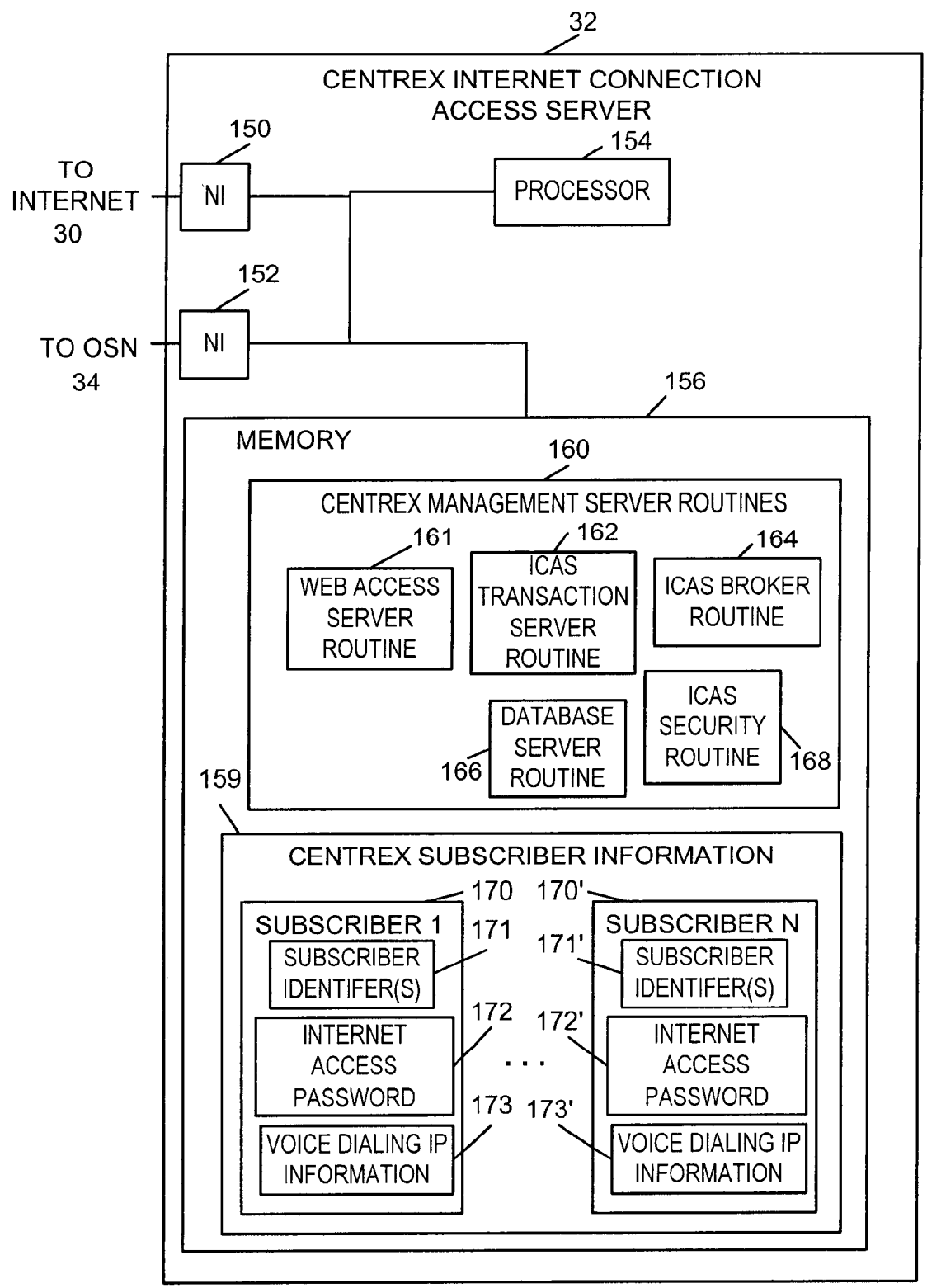
FIG. 2 illustrates an exemplary Centrex internet connection access server which may be used in the system illustrated in FIG. 1

The CICAS 32 will now be discussed briefly with regard to FIG. 2. As illustrated, the CICAS 32 comprises first and second network interfaces 150, 152, a processor 154 and memory 156 which are coupled together as shown in FIG. 2. The first network interface 150 links the CICAS 32 to the Internet 30 while the second network interface 152 links the CICAS 32 to the OSN 34. Thus, the CICAS 32 serves as a gateway by which a service subscriber can gain access from the Internet, after being authenticated, to the various telephone system network components, e.g., the ISCP 16, and VD IPs 18, 20. Through use of the CICAS 32 Centrex service subscribers can manage the Centrex services to which they subscribe via their personal computers and a Web Browser application.

The processor 154 is responsible for executing various applications and/or routines stored in memory to provide firewall and various service management features to Centrex subscribers. The routines executed by the processor 154 are stored in memory 156 until being needed by the processor 154, e.g. to service a Centrex subscriber. Memory 156 includes Centrex subscriber information 159. The Centrex subscriber information includes, for each Centrex subscriber 170, 170', one or more subscriber identifiers 171, 171', the subscriber's Internet access password 172, 172', and information identifying the voice dialing IP 18, 20 assigned to store the particular Centrex subscriber's voice dialing records and to provide voice dialing services. As will be discussed below, a Centrex subscriber's Internet access password is set by the user the first time the subscriber accesses the CICAS 32 and identifies him or herself as a new Centrex service subscriber.

In addition to the Centrex subscriber information 159, memory 156 includes a set of Centrex management server routines.

The Centrex management server routines 160 include a Web access server routine 161, an ICAS transaction server routine 162, a database server routine 166, an ICAS broker routine 164, and an ICAS security routine 168. The routines which form the Centrex management server application 160 are responsible for providing a subscriber access to Centrex subscriber information and hardware required to manage the subscriber's Centrex service.

The Web access server routine 161 is responsible for initially interfacing with the Centrex service subscriber and for providing web pages to be displayed. The server routine 161 interfaces with the other routines, which are responsible for performing security checks, retrieving subscriber data, and performing other functions.

The transaction server routine 162 is responsible for determining what other routines need to be accessed to provide the user with a requested service or transaction.

The database server routine 166 is responsible for controlling access to and retrieval of locally stored information, e.g., Centrex information included in the subscriber information database 159. The database server routine 166 interacts with the other routines 162, 164, 168 to provide Centrex subscriber information as required.

The ICAS broker routine 164 is responsible for determining the availability of system components, e.g., system resources, to meet the needs of the various other routines including the transaction server routine 162 and to retrieve data as needed from other components of the system 100. Accordingly, when attempting to establish a connection with an IP or another network device such as the ISCP 16, e.g., to obtain information, the transaction server routine 162 uses the ICAS broker routine 164 to determine resource availability and to arrange the desired connection used to perform the data retrieval operation.

The ICAS security routine 168 is responsible for providing security, e.g., firewall protection. The ICAS security routine 168 is invoked when a subscriber attempts to login to manage his/her Centrex services and when a subscriber invokes management functions such as the password modification function for which added security measures are employed. In some embodiments security routine 168 prompts the user for additional information beyond the subscriber's Internet password and then check the information provided by the subscriber, to add an additional level of security to certain operations such as password modification.

Figure 3:
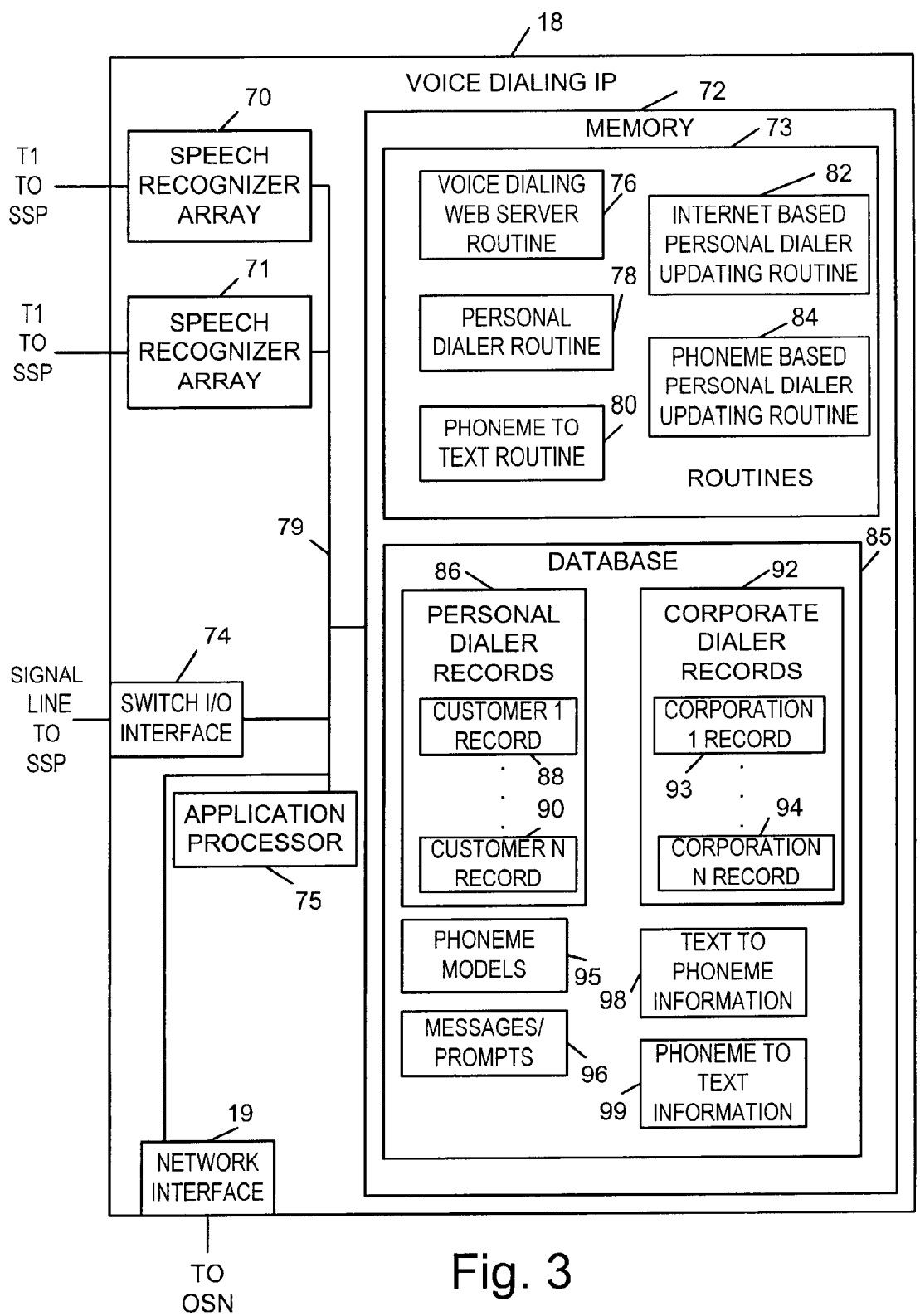
FIG. 3 illustrates an exemplary voice dialing intelligent peripheral device suitable for use in the system of FIG. 1.

An exemplary voice dialing IP 18 will now be described with reference to FIG. 3. The voice dialing IP 18 can interact with the CICAS 32 to allow updating via the Internet of a voice dialing record, sometimes called a personal voice dialing directory, maintained for a Centrex service subscriber.

The voice dialing IP 18 comprises a plurality of speech recognizer arrays 70, 71 each of which is coupled by a voice line, e.g., T1 link, to an SSP. In addition to performing speech recognition functions, the speech recognizer arrays 70, 71 serve as interfaces to the voice lines to which the IP 18 is coupled. The IP 18 also includes a switch input/output interface 74 for coupling the IP 18 to an SSP via a control line, e.g., over which signals in accordance with the 1129 CORE protocol may be transmitted. In addition to the circuitry which is used to interface with the SSP, the IP 18 includes a network interface 19 for coupling the IP 18 to the OSN 34 and the various devices coupled thereto. Thus, the IP 18 and data included therein, can be accessed via the switch (SSP) to which the IP 18 is coupled or by another device such as the CICAS 32 via OSN 34.

In order to perform various operations, the IP 18 includes an application processor (CPU) 75 and memory 72. The memory includes a set of routines 73 and a database 85. The application processor 75 is coupled to the switching interface 74, network interface 19, memory 72, and speech recognizer arrays 70, 71 via a local bus 79 which couples the components of the voice dialing IP together.

The database 85 includes information used by the IP 18 to perform voice dialing operations as well as to create, update, and maintain personal dialing records for each Centrex subscriber served by the IP 18. The database 85.includes a set 86 of personal dialer records 88, 90, one record per customer. In addition it includes a set 92 of corporate dialer records 93, 94. A different corporate dialer record may exist for each company and/or division of a company. In addition to dialing records which include, e.g., speech recognition models and telephone numbers, the database includes a set of phoneme models 95, message prompts 96, text to phoneme information 98, and a dictionary of potential names 99.

The application processor 75 executes the various routines 73 when called upon to perform various functions supported by the voice dialing IP 18. Voice dialing Web server routine 76 is responsible for presenting a Centrex voice dialing service subscriber the voice dialing information included in the subscriber personal dialer record via OSN 34 and the CICAS 32, e.g., in an HTML format that can be displayed using a web browser. The Web server routine 76 is also responsible for receiving from the subscriber data representing modifications to the subscriber's voice dialing record and for calling the Internet based personal dialer updating routine 82 to control the updating of the subscriber's personal dialer record based on the information received from the customer via the Internet.

The speech based personal dialer updating routine 84 is responsible for providing a Centrex voice dialing service subscriber the opportunity to update his/her personal voice dialing record via DTMF and/or voice input obtained through a conventional voice connection as opposed to an Internet connection. As will be discussed in detail below, the updating routine 84 uses the speech to text routine 80 to convert a spoken name into text information which may be used as a name entry in the subscriber's personal dialer customer record. Personal dialer routine 78 is used to actually perform voice dialing operations in contrast to the functions of creating and updating of personal dialer records 88, 90.

Figure 4:
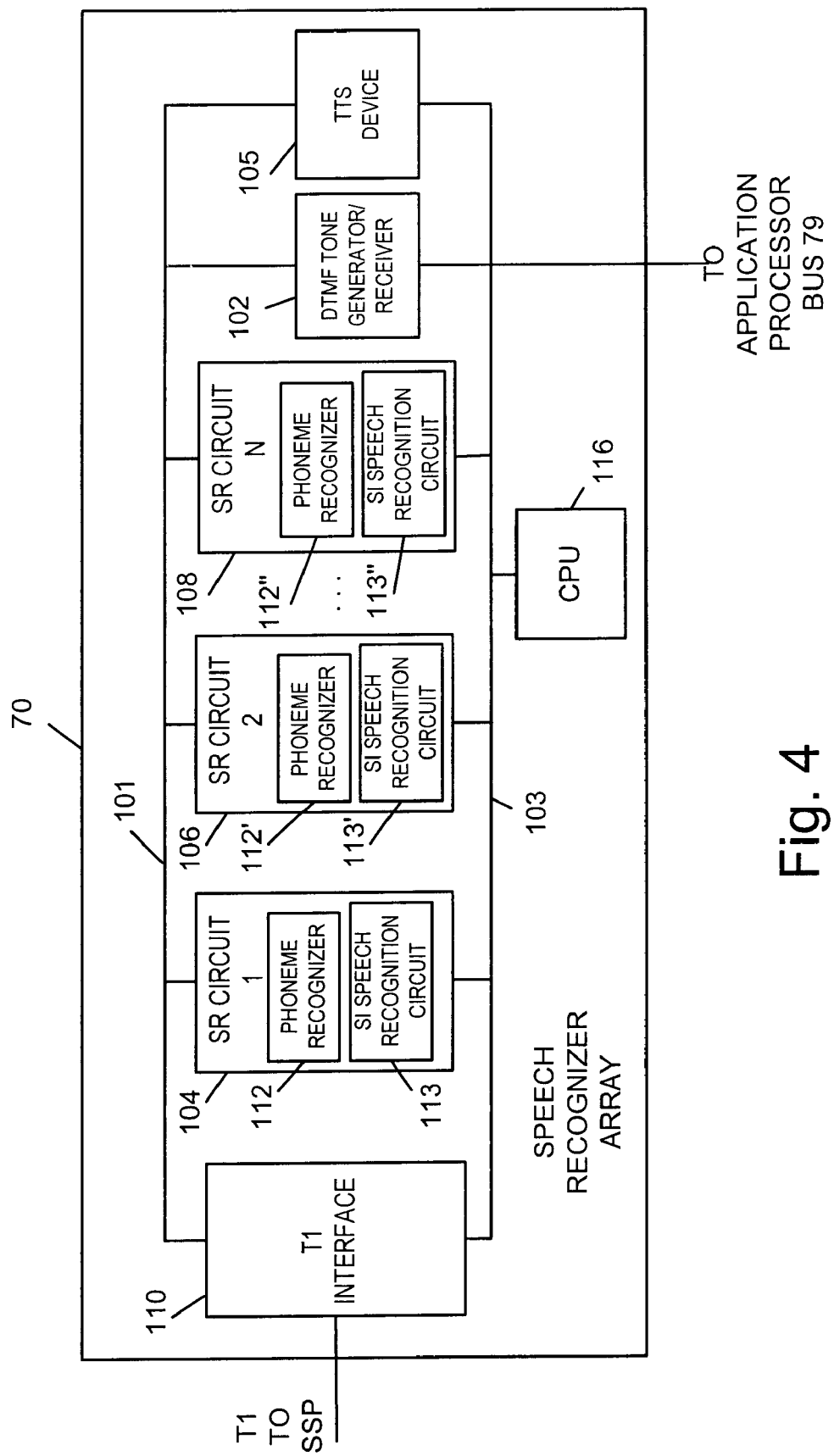
FIG. 4 is a detailed illustration of an exemplary speech recognizer array which can be used in the voice dialing IP of FIG. 3.

An exemplary speech recognizer array 70 will now be described in detail with reference to FIG. 4. The speech recognizer array 70 comprises a T1 interface 110, a plurality of N speech recognition circuits 104, 106, 108, a plurality of N speaker independent model training circuits 105, 107, 109, a DTMF tone generator/receiver circuit 102 and a text-to-speech (TTS) device 105. The components 110, 104, 105, 106, 107, 108, 109, 102, 103 of the speech recognizer array 70 are coupled together by a high bandwidth, e.g., voice, bus 101 and a lower bandwidth, e.g., data/control, bus 103. The data/control bus 103 is coupled to application processor bus 79. A CPU 116 is provided for controlling allocation of speech recognition resources, e.g., assignment of the speech recognition circuits 104, 106, 108, to service different calls and to oversee bus traffic as well as interaction with the IP's application processor 75. T1 interface 110 acts as the interface between the voice connection with the SSP and the speech recognition circuits 104, 106, 108, SI model training circuits 105, 107, 109, DTMF tone generator/receiver circuit 102, and TTS device 103 of the speech recognizer array 70.

During a voice model training operation, one of the speech recognition circuits 104, 106, 108 is used to identity a spoken name in one or more speech samples received from a subscriber while the corresponding SI model training circuit 105, 107, 109 is used to generate a speaker independent speech recognition model, e.g., a phonetic representation of the spoken name.

The speech recognition circuits 104, 106, 108 are used during voice dialing operations to detect names in a voice dialing directory, spoken numbers, and/or commands. Speech recognition circuits 104, 106, 108 normally perform speaker independent speech recognition operations. However, in some embodiments, they are also used to perform speaker dependent recognition of one or more names.

During voice based model training operations, the speech recognition circuit 104, 106, 108 process the received speech corresponding to a name and compares it to a wide range of name hypothesis corresponding to an extensive dictionary 99 of possible names. In this manner, a spoken name can be recognized and a text version of the name can be generated, e.g., from information included in the dictionary 99 of possible names. A SI speech recognition model corresponding to the name is generated by one of SI model training circuits 105, 107, 109. In this manner, a phonetically accurate model of the name is generated for future speech recognition purposes. As will be discussed below, the text version of the recognized name and corresponding a generated speaker independent speech recognition model may be stored in a subscriber's voice dialing customer record for use during a subsequent voice dialing operation.

During voice dialing operations, speech recognition models, e.g., speaker independent speech recognition models, stored in a subscriber's voice dialing customer record 88, 90 are retrieved from the database 85 and supplied to speech recognition circuit 104, 106 or 108 assigned to service the call. The retrieved models may be used in conjunction with speaker independent models of commands, names of locations, and/or numbers. The speaker independent speech recognition models obtained from the customer record 88, 90, which may be in the form of phonetic representations of the modeled names, are used to determine which, if any, name in a subscriber's personal voice dialing directory was spoken. The other speaker independent models are used during a voice dialing operation to detect spoken commands, names of locations and/or numbers, e.g., digits to dial or numbers spoken in response to a prompt for input.

In one embodiment, during a voice dialing operation, recognition of phones, or phonemes which maybe used synonymously, is performed in an integrated way as part of the overall speech recognition operation. As part of the speech recognition operation, the incoming speech, after appropriate processing, is compared against a network of possible phone/phoneme sequences dictated by the speech recognition models used and associated grammar. The best path in the network, corresponding to a particular word, phrase or result, e.g., no valid word recognized, is selected during the speech recognition operation and corresponding word, phrase or result is declared as the outcome of the speech recognition operation. Accordingly, in at least one exemplary voice dialing implementation, phones are recognized in the context of the expected phone-strings, dictated by a grammar that defines the space of possible text strings, to be spoken by the caller, for that application, e.g., voice dialing.

When performing a voice dialing operation, in the event that 1) a name from the subscriber's personal dialing directory is not recognized, and 2) a telephone number is not detected in the form of a spoken number, DTMF input, or a combination of spoken numbers and DTMF input, the speech recognition circuit 104, 106 or 108 may, depending on how the subscriber has configured his personal dialing record, use one or more speech recognition models obtained from the corporate dialer records 92 in an attempt to identify a name in received speech.

DTMF tone generator/receiver 102 is responsible for detecting DTMF signals and generating DTMF signals when needed, e.g., to cause the SSP to route a call to a destination telephone number. By using the speech recognition circuit 104, 106 or 108 in combination with DTMF tone generator/receiver 102 a voice dialing subscriber can perform a dialing operation by supplying a telephone number to be dialed as a combination of spoken numbers and numbers input by depressing telephone keys which causes DTMF input signals to be generated.

The TTS device 105 is included in the speech recognizer array 101 so that messages and prompts 96 can be played to a subscriber as required. Prompts may be played, e.g., to report recognition problems, to play an announcement of the recognized name to be dialed, and to prompt for input when needed.

The components of the speech recognizer arrays 70, 71 operate in conjunction with the application processor 75 and various routines 72 to provide voice dialing services and the ability to update and revise subscriber's voice dialing directories through the use of audio and DTMF input. In the case of Internet based updating of a subscriber's voice dialing records, speech recognizer arrays 70, 71 are not used. This is because, during the Internet based voice dialing record updating process, there is no audio connection via the SSP to the subscriber.

Having described the components of the communications system 100, initial provisioning of a service to a Centrex subscriber using the various system components will now be discussed with reference to FIGS. 5–9. Subsequent management of a Centrex service via the Internet will then be described with regard to FIG. 10. The top row in FIGS. 5–9 illustrate the various system components involved in performing the steps illustrated in the figure. The starting, e.g., initial condition, is shown in the block immediately below the row of system elements. The exit condition of the system 100, at the end of the processing illustrated in each figure, is shown in the last block located at the bottom of FIGS. 5–9. In FIGS. 5–9 arrows are used to show the transfer of data, voice, and/or control signals between various components of the system 100. Labeled boxes within arrows are used to represent processing operations or steps.

Figure 5:
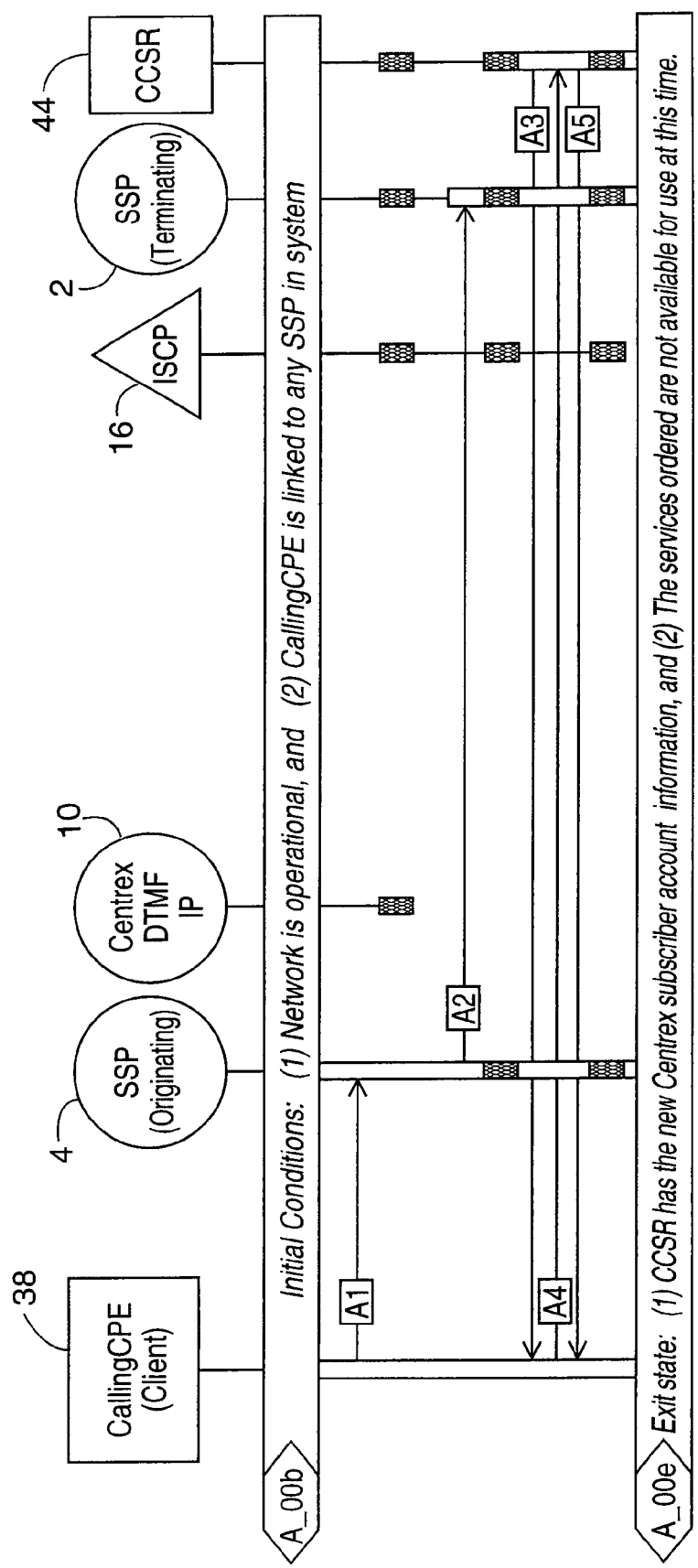
FIGS. 5–9 are flow diagrams illustrating steps, messages, and data associated with setting up, configuring, and using Centrex account information in accordance with the present invention.

FIG. 5 illustrates the initial processing associated with provisioning Centrex service for a new subscriber. For purposes of this example, it is assumed that the first subscriber, located at customer premises 22, seeks to set up Centrex service for the first time. Accordingly, at the start of FIG. 5, the initial conditions <A_00b> are that the system 100 is in operation and that the customer premise equipment, e.g., telephone 38, is linked to any one of the SSPs in the system 100.

In step A1 the person wishing to subscribe to Centrex service places a call to a Centrex service subscription number. The call is received by the SSP 4 to which the caller is coupled. Thus, in the example the second SSP 4 becomes the originating SSP. In step A2, the originating SSP 4 sends an initial address message (IAM) to the SSP 2 corresponding to the dialed Centrex service subscription number. Thus, the SSP to which the Centrex customer service representative (CCSR) 44 is connected becomes the terminating SSP for this portion of the processing.

In step A3, the service representative responds to the caller and prompts the caller for subscription information including the landline and mobile telephone numbers for which Centrex service is to be provided. Then in step A4, the caller provides subscription information, including the requested telephone numbers, to the CCSR 44. In response to receiving the requested Centrex subscription information, the CCSR 44, in step A5, provides Centrex-service activation instructions to the caller. The activation instructions include a temporary PIN value corresponding to the last for digits of the caller's landline phone to which Centrex service is to be added, an 800 number to call from the caller's landline phone to activate the Centrex service, and information on how soon the caller can call to activate the subscribed services.

The condition existing upon completion of the steps illustrated in FIG. 5 are shown in exist state A_00e. In exist state <A_00e>, the CCSR 44 has the new Centrex subscriber account information and the services ordered are not yet available for use by the new Centrex subscriber.

Figure 6:
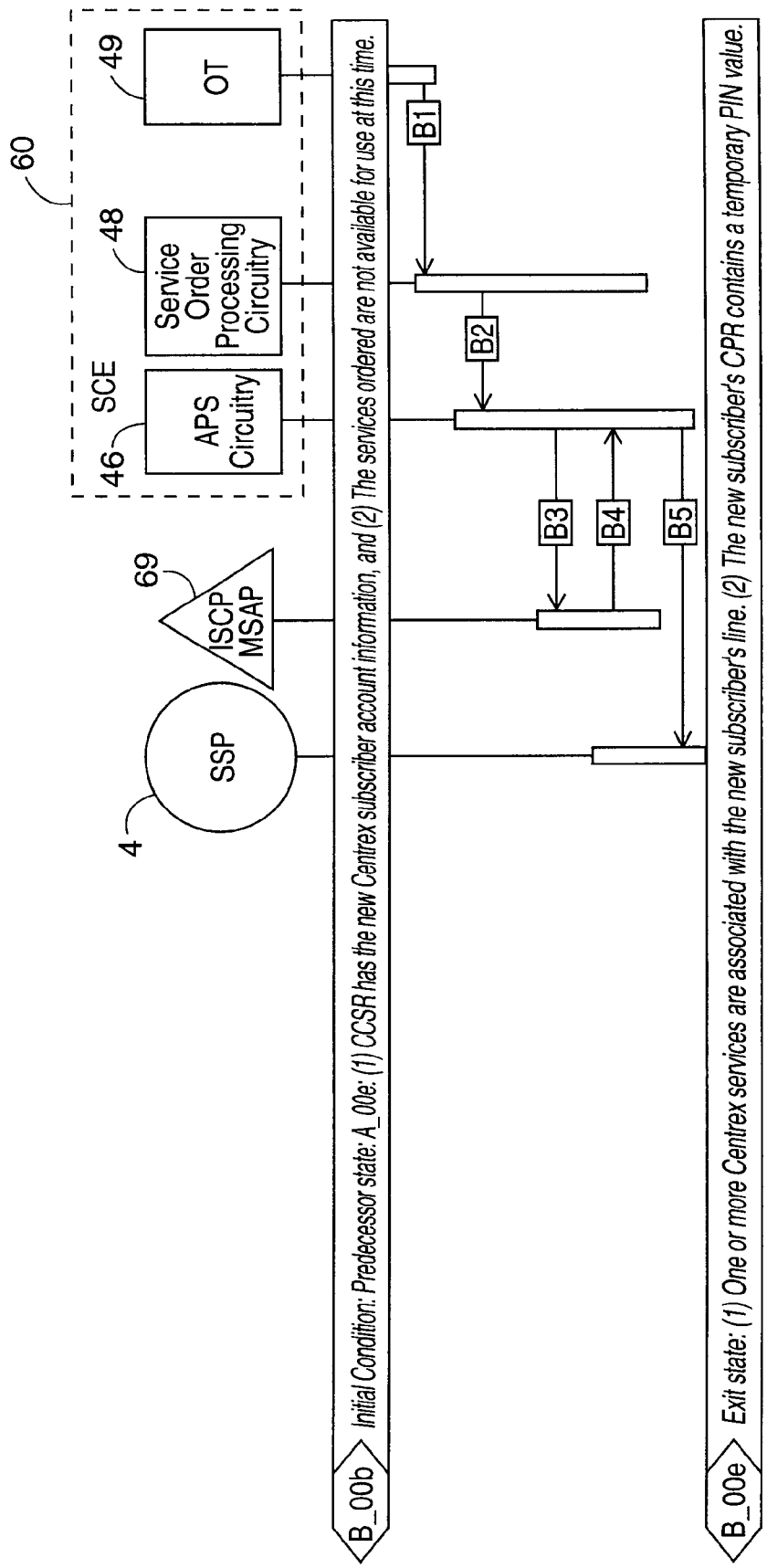

The steps associated with the creation of a new customer's call processing record and the initial setting of AIN triggers on the new subscriber's telephone lines are shown in FIG. 6. In FIG. 6, the initial state <B-00b> is the same as the FIG. 5 exit state <A_00e>. Accordingly, in state <B-00b> the CCSR 44 has the new Centrex subscriber account information and the services ordered are not available for the new subscriber's use. The process illustrated in FIG. 6 begins with step B1 wherein the CCSR 44 initiates a service creation work order via entering the new subscriber's subscription information into operator terminal (OT) 49 and having that information supplied to the service order processing circuitry 48. The SOP circuitry 48 creates from the subscription information a service order which, in step B2, is supplied to the AIN provisioning system circuitry 46.

In response to the service order, the APS circuitry creates a call processing record (CPR) for the new subscriber which includes a set of call processing instructions designed to control the SSPs and other network elements, in response to messages initiated by AIN triggers set on the subscriber's lines. In step B3, the APS 46 forwards the new subscriber's CPR, including the subscribers assigned temporary PIN value, to the MSAP 69 for storage and future use.

In step B4, the MSAP 69 acknowledges to the APS circuitry 46 receipt and storage of the new subscriber's CPR in the MSAP's set of customer data 71. Next, in step B5, the APS circuitry 46 updates the SSPs associated with the new subscriber's telephone line by setting one or more AIN triggers on the subscriber's lines, e.g., terminating attempt triggers. In the FIG. 1 example, when configuring the account for the first customer located at CP1 22, a TAT trigger would be set at the second SSP 4 and at the MTSO servicing the first subscriber's mobile phone 37.

At the end of the process illustrated in FIG. 6, in exit state <B_00e>, it can be seen that one or more Centrex services are associated with the new subscriber's lines and that the CPR for the new subscriber includes the subscriber's temporary PIN value.

Figure 7:
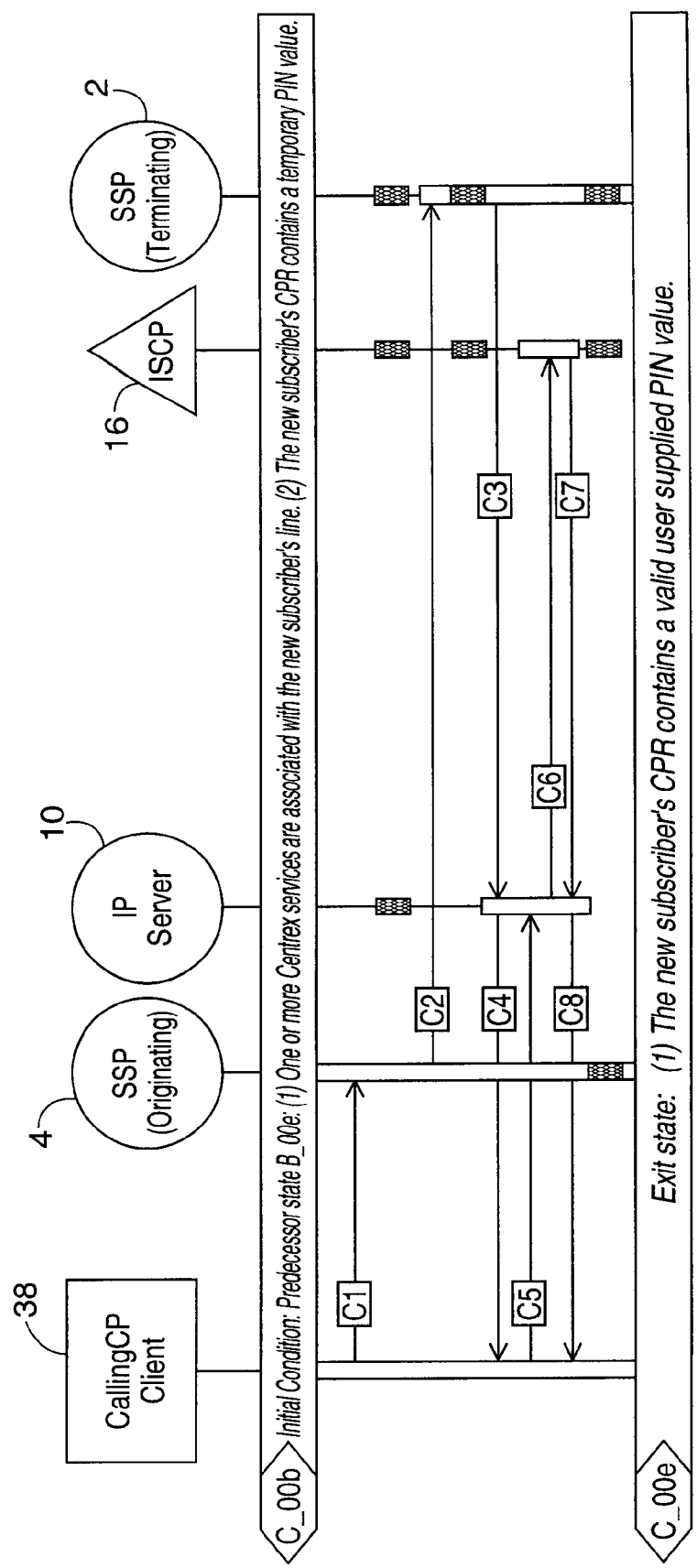

FIG. 7 illustrates the process by which a new Centrex subscriber activates his/her Centrex service by dialing a number corresponding to the Centrex DTMF IP 10, for the first time. In FIG. 7, the initial state <C-00b> is the same as the FIG. 6 exit state <B_00e>. Accordingly, in state <C-00b> one or more Centrex services have already been associated with the new subscriber's lines and the new subscriber's CPR includes a temporary PIN value.

To activate the Centrex service, in step C1, the user places a call from the subscribing line, e.g., phone 38, to the Centrex service activation number previously provided. Since the dialed Centrex activation telephone number corresponds to Centrex DTMF IP 10, the SSP 4 which, in this example is the originating SSP, sends, in step C2, an initial address message (IAM) to SSP 2 to which DTMF IP 10 is connected. Thus, in this example, SSP 2 is the terminating SSP. In step C3, termination SSP 2 then forwards the new subscriber's call to the Centrex DTMF IP 10 to which the call was directed.

With the voice connection between the DTMF IP 10 and the new subscriber established, the DTMF IP 10 plays, in step C4, PIN change instructions to the new subscriber. Then, in step C5, the user enters, in the form of a DTMF input or spoken digits, a new PIN value. The DTMF IP 10, which includes speech recognition capability, collects the new PIN value from the subscriber and, in step C6 forwards the new PIN value to the ISCP 16 via a message sent using the 1129+ (SR3511) protocol.

In step C7, the ISCP 16 updates the new subscriber's PIN information stored in the customer database 71 and sends a message to the DTMF IP 10 acknowledging receipt of the PIN information and the updating of the new subscriber's CPR. In response to the message from the ISCP 16, the IP 10, in step C8 plays one or more service-activation confirmation messages to the subscriber indicating that the subscriber's Centrex service has been successfully activated.

Accordingly, at the end of the process illustrated in FIG. 7 the condition at the exist state <C_00e> is that the new subscriber's CPR includes a valid PIN value that was provided by the subscriber, e.g., 4 digits or letters that can be entered using a standard telephone keypad.

Figure 8:
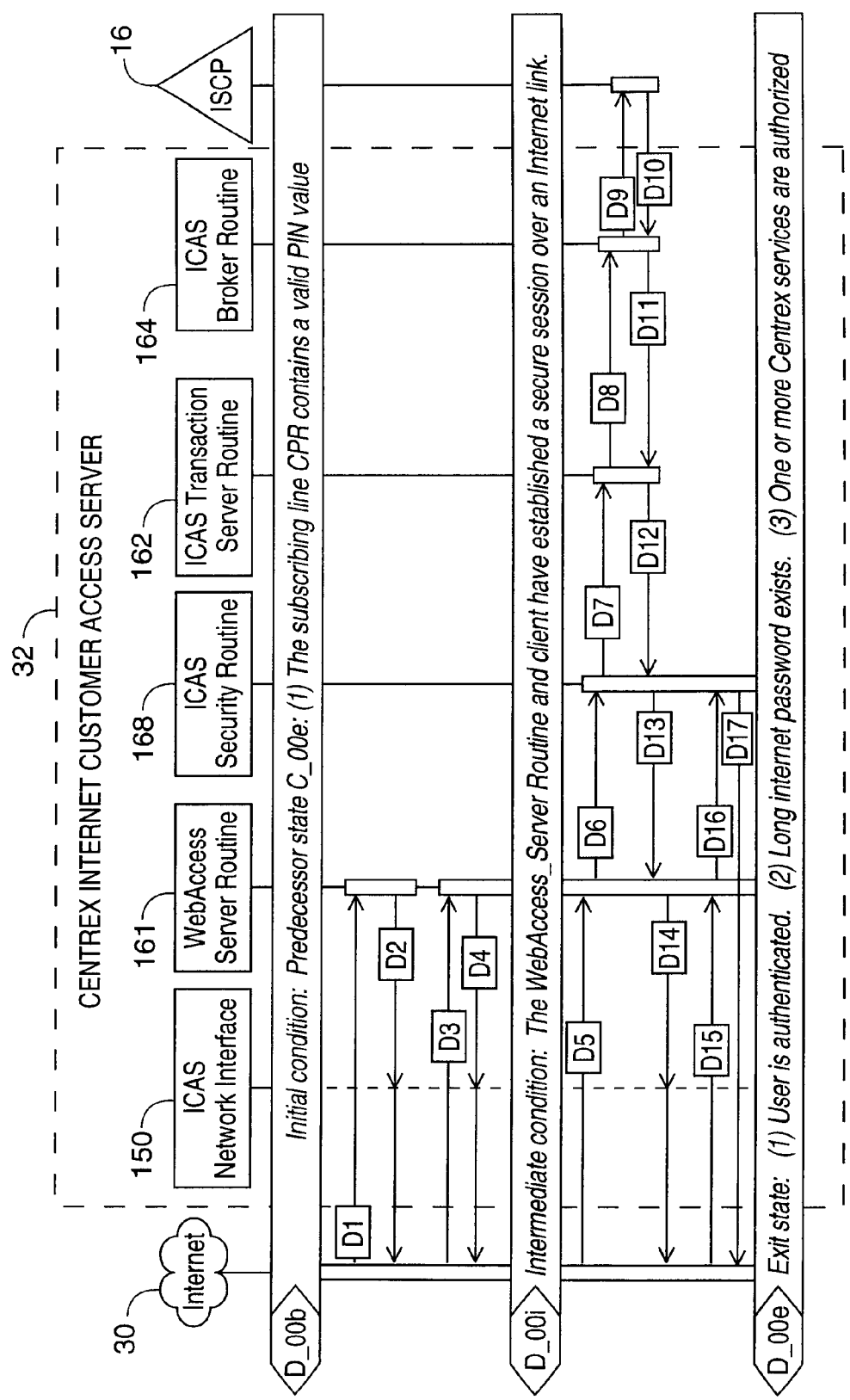

FIG. 8 illustrates the process associated with a new Centrex subscriber who has already activated his/her service via the telephone, connecting via the Internet to manage his/her Centrex services for the first time. In FIG. 8, the initial state <D-00b> is the same as the FIG. 7 exit state <C_00e>. Accordingly, in state <D-00b> the new subscriber's CPR includes a valid user provided PIN value.

The process illustrated in FIG. 8 begins in step D1 wherein the subscriber submits, using a Web Browser application, a request to the CICAS 32 for access to a Centrex Web access default web page. The request is forwarded through the network interface 150 to the Web access server routine 161. Next, in step D2, the Web access server routine returns to the subscriber a Web Access default page 100, e.g., a page of the type illustrated in FIG. 10. The subscriber's Web Browser displays the default page on the screen of computer 36.

Figure 11:
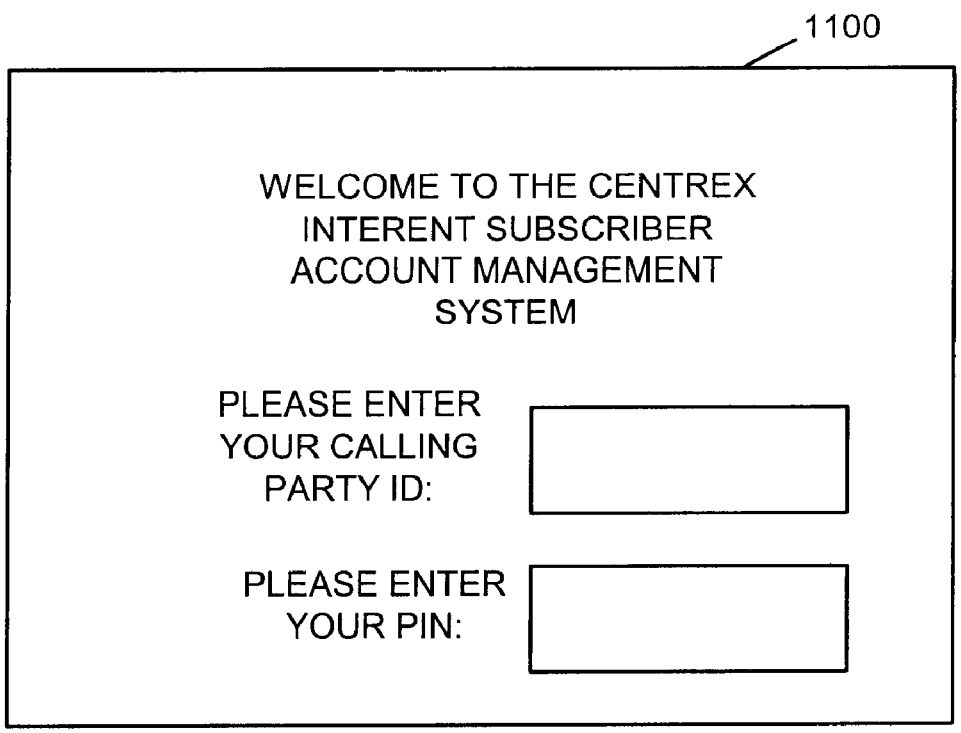

Next, the subscriber requests to manage his/her existing Centrex account by, e.g., clicking on the displayed "MANAGE YOUR EXISTING CENTREX ACCOUNT" option. This causes, in step D3, the subscriber's Web browser application to send a Centrex service access request to the Web access server routine 161. In response to the service access request, in step D4, the Web access server routine 161 initiates a secure communications session with the subscriber's Web browser and then sends the subscriber a request for the subscriber's CallingPartyID and PIN value. The request may be presented to the use in the form of a data entry screen 1100 as shown in FIG. 11.

In response to the request, in step D5, the subscriber provides to the Web access server routine 161, his/her CallingPartyID, e.g., Centrex telephone number, and PIN.

Following the receipt of the information, in step D6, the Web access server routine 161 requests that the ICAS security routine 168 authenticate the user based on the received information and ensure that this is a new account. Then, in step D7, the ICAS security routine requests that the ICAS transaction server retrieve the current PIN value stored in the subscriber's CPR. In step D8, the ICAS transaction server routine requests a copy of the subscriber's current CPR from the ICAS broker routine 164 which is responsible for performing the actual retrieval operation.

In step D9 the ICAS broker routine requests the subscriber's CPR from the ISCP 16. In step D10, the ISCP 16 sends the subscriber's CPR to the ICAS Broker routine 164. The Broker routine 164 then passes, in step D11, the retrieved CPR to the ICAS transaction server routine 162. In step D12 server routine 162 forwards the PIN, obtained from the CPR, to the ICAS security routine 168. In step D13, the ICAS security routine 168 compares the recently provided PIN to the retrieved PIN obtained from the CPR and, assuming they match, sends an authentication message to the Web access server routine 161.

In step D14, the Web access server routine requests that the subscriber enter a long, e.g., 8 digit, alphanumeric password to by used for future Internet access operations. The server routine 161 also requests that the subscriber complete an initial log-in form which provides information used to implement the subscriber's Centrex services. In step D15, the user enters a long password, completes the initial log-in form and repeats the password entry to confirm the first value entered. In step D16, the Web access server 161 ensures that the password meets necessary requirements and that any mandatory fields are completed on the initial log-in form in step D16. The login password and log-in form information are passed to the ICAS security server routine 168.

In step D17, the ICAS security server routine 168 saves the submitted long password and other service information, e.g. in the local set of Centrex subscriber information 159, and then signals the subscriber that the set-up operation has been successfully completed.

Accordingly, at the end of the process illustrated in FIG. 8, the new subscriber is authenticated, a long password to be used for Internet access to Centrex services exists for the subscriber and one or more Centrex services are authorized for the subscriber.

Figure 9:
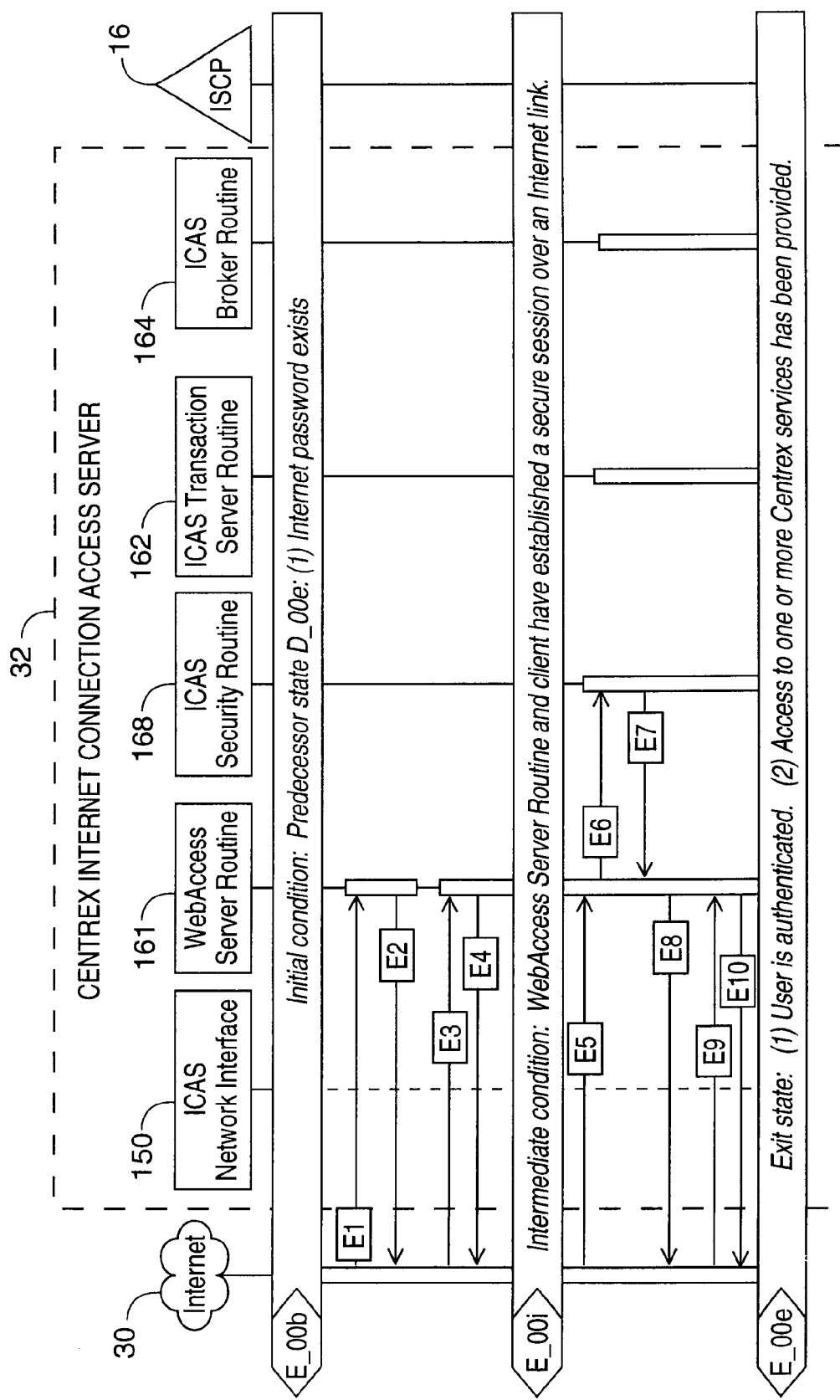
Figure 10:
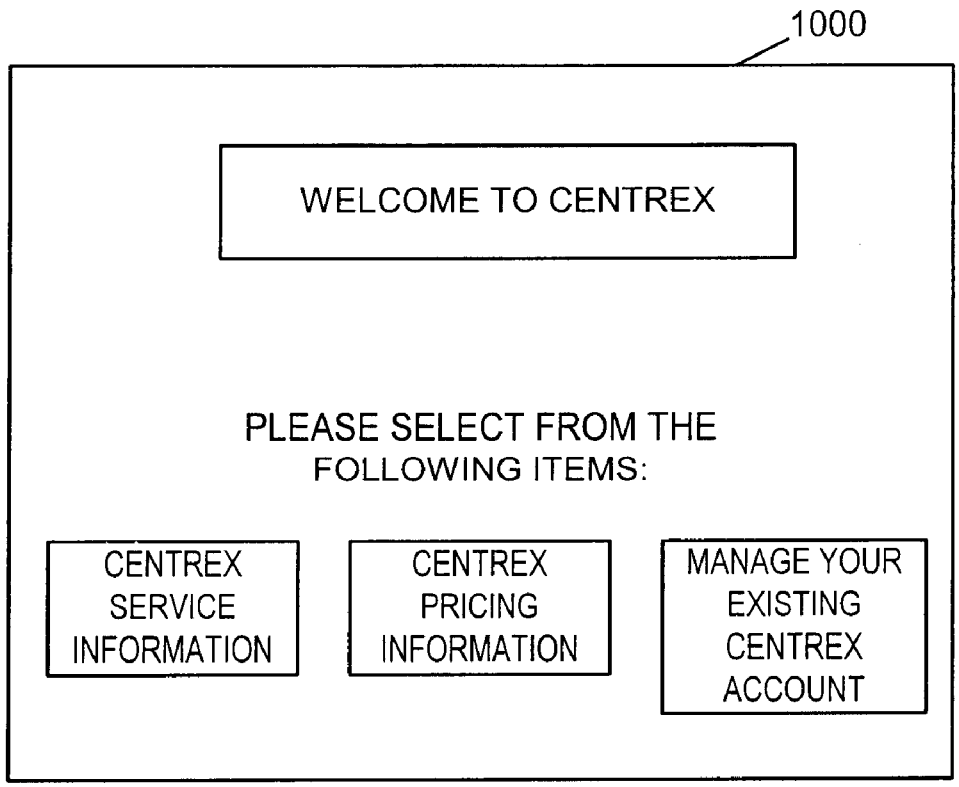
FIGS. 10–14 illustrate various pages which may be displayed to a Centrex voice dialing service subscriber when the subscriber accesses and/or updates voice dialing service information via the Internet.

The process of accessing and updating Centrex subscriber account information via the Internet 30, after an initial Internet access operation, is illustrated in FIG. 9. In FIG. 9, the initial state <E-00b> is the same as the FIG. 8 exit state <D_00e>. Accordingly, in state <E-00b> the subscriber's long PIN used for Internet access and other account information has already been stored in the set of Centrex subscriber information 159 maintained by the CICAS 32.

In step E1, a customer request to access his/her Centrex account is received by the Web access server routine via the Internet 30 and the network interface 150. In step E2, the Web Access Server Routine returns the default web page 1000 to the subscriber. In step E3, the subscriber requests to manage his/her existing Centrex account. Then, in step E4, the Web access server routine 161 initiates a secure session with the subscriber's Web browser application and requests Calling Party Id and PIN (password) information, e.g., by sending the page 1100 to the subscriber's browser.

In step E5, the user provides the requested ID and password information. Then in step,E6, Web access server routine 161 requests that the ICAS security routine 168 authenticate the user based on the received Calling Party Id and PIN. In step E7, the ICAS security routine 168 authenticates the subscriber by comparing the received ID and PIN information to account information, e.g., PIN information for the identified subscriber, stored in the ICAS's set of Centrex subscriber information 159 and, assuming the PIN matches the stored PIN, authorizes the Web access server routine to provide the subscriber access to his/her account information.

Figure 12:
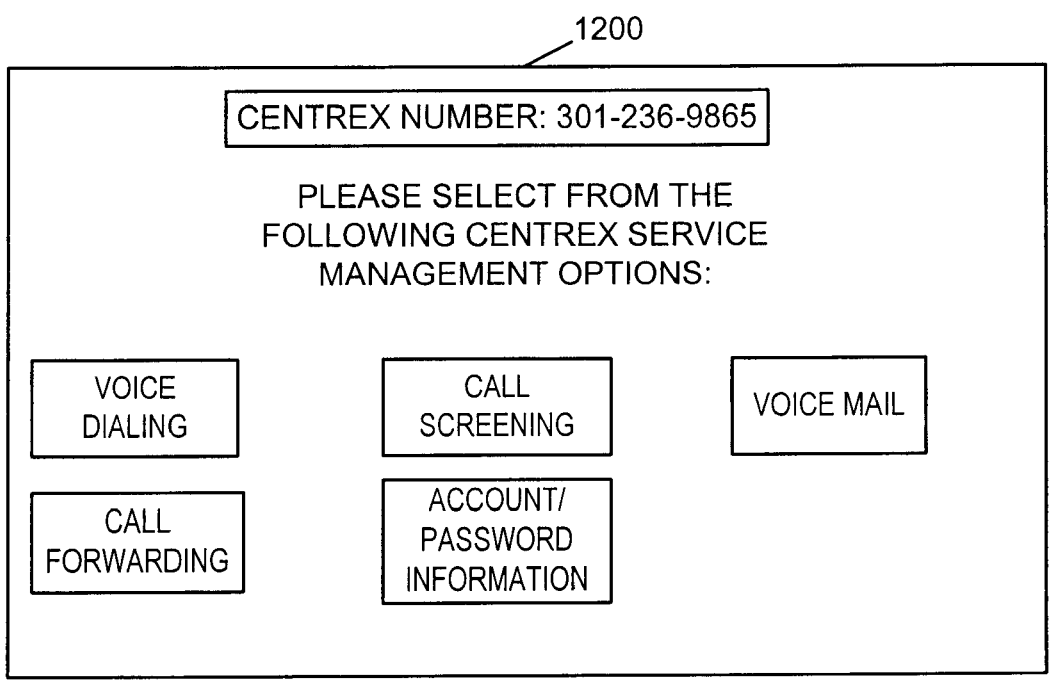

In step E8, assuming the subscriber was authenticated, the Web access server routine 161 presents the subscriber with a Centrex management service selection page which lists options for managing the various services to which the user subscribes. FIG. 12 illustrates an exemplary Centrex management service selection page 1200 wherein the subscriber is presented with the option of managing his/her voice dialing service, call forwarding service, call screening service, account/password information, or voice mail.

In step E9, the user communicates the selected management operation to the Web access server routine 161. Then in step E9, the Web access server retrieves the Centrex subscriber information it has available to it from its own database relating to the selected service and, if another device e.g., IP is responsible for maintaining customer records relating to the selected service, couples the subscriber to the device responsible device. The subscriber is also presented in step E10 with a new Web page reflecting the retrieved account information relating to the service to be managed.

Consider for example, if the first subscriber had in step E9 selected to manage his/her voice dialing service. In such a case, in step E10, the subscriber would be coupled via the Internet, ICAS 32 and OSN 34 to VD IP 18 where the subscriber's voice dialing records reside. In addition, the subscriber would be presented with a voice dialing management page such as the page 1300 illustrated in FIG. 13 showing the existing voice dialing information.

At the end of the process illustrated in FIG. 9, the subscriber has been authenticated and has been provided access to one or more Centrex services, e.g., account management services. This condition is shown in the FIG. 9 exist state <E__00e>.

Internet based management of a subscriber's Centrex voice dialing record, maintained in the VD IP 18, will now be discussed. At the end of the process shown in FIG. 13, in the case of a voice dialing directory management operation, the user will be connected to the VD IP 18 via the Internet. The VD IP's voice dialing web server routine 76 interfaces between the subscriber's Web browser and the various routines of the voice dialing IP. The Internet Based personal dialer updating routine 82 is activated by the voice dialing web server routine in response to the subscriber's request to manage/update his or her personal voice dialing service.

Figure 13:
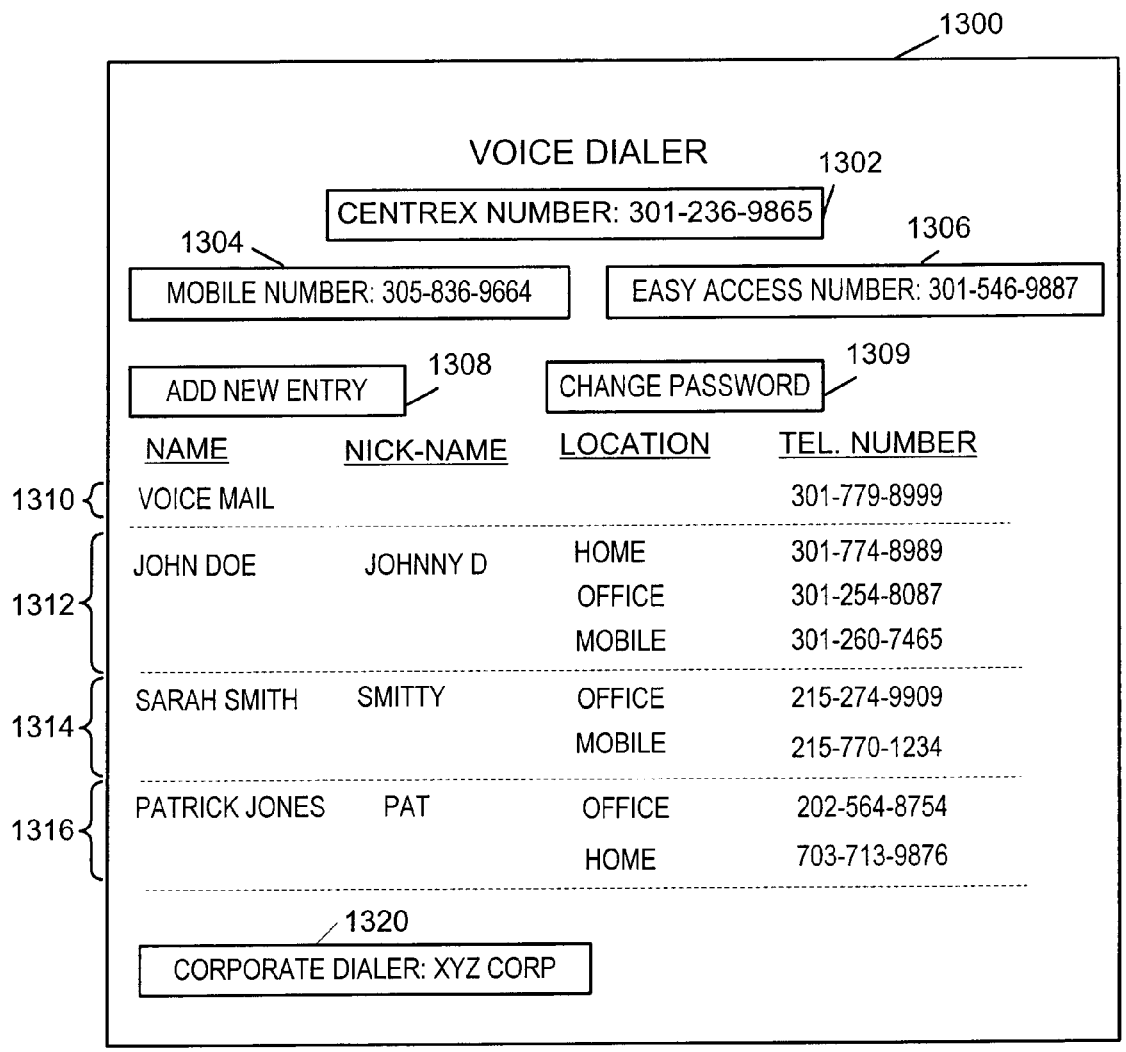

The routine 82 begins by displaying via the user's Web Browser, Voice Dialing window 1300 illustrated in FIG. 13. The window displays voice dialing information included in the subscriber's voice dialing record which the user may wish to modify, add to, or delete. It also displays control options, e.g., options such as the option of adding a new entry 1308, and modifying the subscriber's password, which the user can select, e.g. by double clicking on the displayed option.

The voice dialer information displayed to the subscriber includes, e.g., the subscriber's Centrex phone number 1302, the subscriber's mobile phone number 1304, the subscriber's easy access number 1306, the name of a corporate dialer 1320 if the subscriber has designated one to be used in conjunction with the subscriber's personal dialer, and voice dialing entries, e.g., calling records 1310, 1312, 1314, 1316. Each calling record corresponds to one individual or party who the voice dialing subscriber can call through the use of voice dialing, e.g., by speaking the person's name or nickname.

Unlike some known voice dialing systems, the voice dialing system of the present invention allows multiple, e.g., different, names corresponding to the same party to be used in initiating a voice dialing call. In the illustrated embodiment, both a primary name and a nickname are supported. Accordingly, multiple, e.g., alternative names for the same party or individual, can be stored and associated with the same telephone number or numbers in a calling record.

The primary name and nickname form a set of names with which one or more telephone numbers are associated. As will be discussed below, a speaker independent speech recognition model is generated for each name and nickname in a set of names and stored as part of a subscriber's voice dialing record.

One or more telephone numbers, corresponding to different locations or different individuals such as a secretary, are associated with each set of names. During a voice dialing operation, the subscriber can call a party by stating the party's name and the desired location the subscriber wishes to call. While the term location is used here, location is used a telephone number identifier. Thus, in the context of the present application, the "location" may actually be an identifier of a person such as a secretary associated with the named party or individual. If the VD IP detects a name included in the subscriber's voice dialing record and detects a spoken location, the telephone number in the record corresponding to the name and location will be used. If only a name is detected, it is assumed that the first telephone number corresponding to the name is to be used for dialing purposes.

Locations which may be specified can be selected from the following list of identifiers:

| OFFICE | OFFICE 1 | Office 2 | Office 3 |
|---|---|---|---|
| OFFICE 4 | Second Office | Branch Office | Headquarters |
| Secretary | Home | Home 1 | Residence |
| Residence 1 | Residence 2 | Residence 3 | Mobile |
| Mobile 1 | Mobile 2 | Mobile 3 | Temporary Location |

By limiting the list of locations which can be designated, the need for the VD IP to store speech recognition models for custom locations is avoided and a single set of speaker independent speech recognition models can be used for detecting the spoken name of a location for multiple subscribers. For example, to support the above list of 20 possible locations, 20 speaker independent speech recognition models are stored by the VD IP 18 and multiple subscribers.

When presented with the voice dialer information 1300, the subscriber can choose to modify the displayed information, add a new entry or to change his/her password, e.g. by double clicking on an existing entry, icon 1308, or icon 1309, respectively. A subscriber's selections are communicated by the subscriber's computer to the VD IP 18 via the Internet.

If the subscriber selects to add a new entry or to edit an existing entry, the subscriber is presented with a voice dialing entry modification page 1400 which is displayed by his/her browser. The page 1400 includes information relating to the entry to be added or modified.

While having much of the same entry information as the voice dialer page 1300, the voice dialing entry modification page includes additional information relating to an entry as well as entry modification information, e.g., an icon 1407 which may be selected for display a listed location names from which the subscriber can choose when editing the contents of an entry. In addition, the page 1400 includes a submit updated entry icon 1410. The icon 1410 may be selected by the user, e.g., by double clicking, to submit the entry information to the VD IP 18 after the user makes the desired changes to the entry. In response to selection of the submit updated entry icon 1410, the user's web browser transmits the entry information, as modified by the user, to the VD IP 18.

Figure 14:
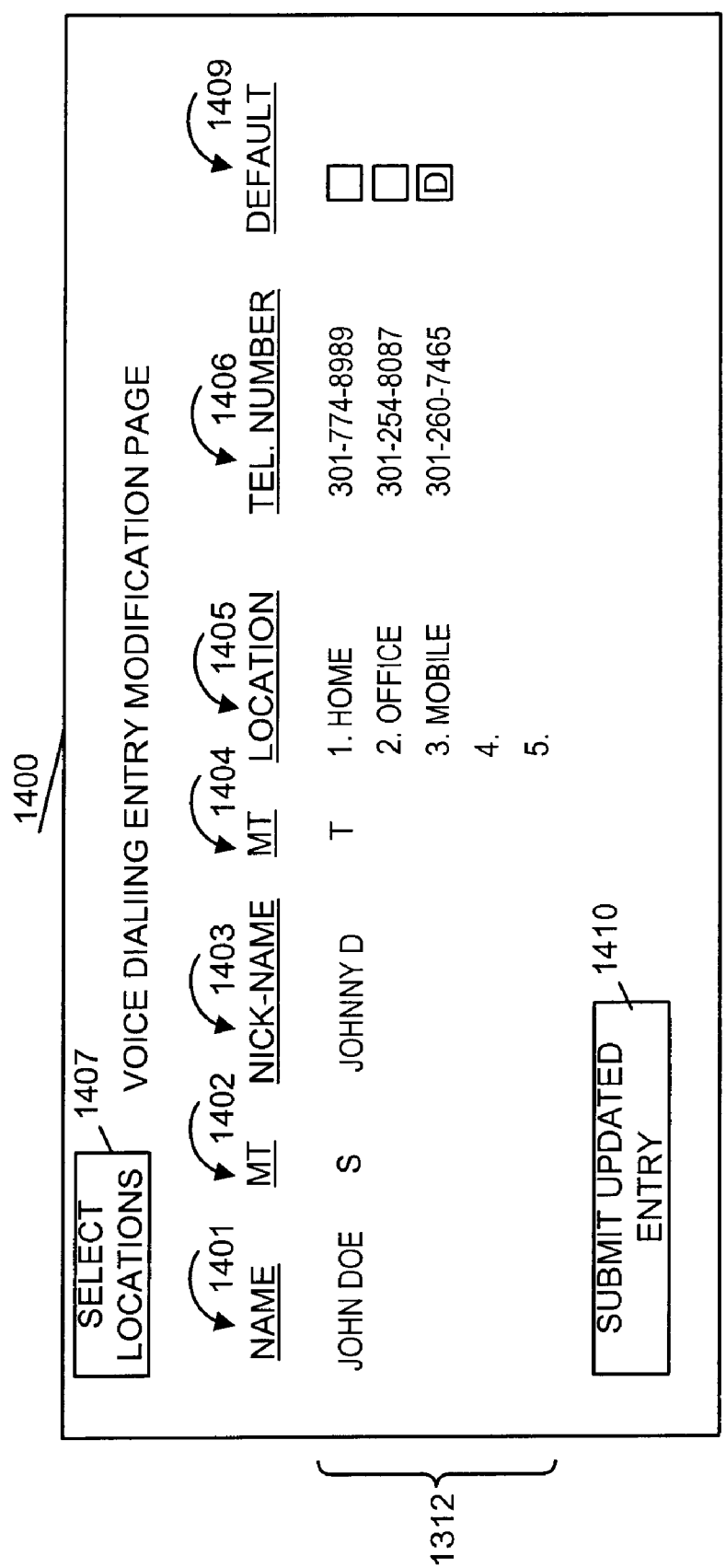

In FIG. 14, the first column 1401, of entry 1312, is a name entry. In the second column 1402, model type information is displayed. As discussed above, speech recognition models used to recognize names can be generated from speech or text in accordance with the present invention. To identify how the speech recognition model was generated model type information is maintained. An S is included in column 1402 if the model associated with the name was generated from speech while a T is included in column 1402 if the speech recognition model was generated from text, e.g., the text in column 1401.

The third column 1403 lists the nickname, if any, associated with the same party or individual, whose name is listed in the first column 1401. The fourth column, 1404 identifies how the speech recognition model was generated for the nickname listed in column 1403, e.g., whether it was generated from speech or text.

The subscriber can change an S to a T in columns 1402, 1404 if desired. This will have the effect of causing the speech recognition model associated with the corresponding name to be generated from the text of the name instead of the speech previously provided by the user. Generally, names trained from a user's speech will be more reliable than those generated from text. Accordingly, the changing from a speech recognition model generated from the user's speech, to one generated from text, is expected to incur infrequently.

The fifth column 1405 illustrated in FIG. 14 lists location information with which a telephone number for the named individual or party is associated. For each location listed in column 1405, a corresponding telephone number is listed in the sixth column 1406.

While places for five possible locations and telephone numbers are shown in FIG. 14, it is to be understood that any number of different locations can be supported with, e.g., a different telephone number associated with each location.

In accordance with one embodiment, in the absence of the subscriber explicitly designating a telephone number in a calling entry as the default telephone number, the first listed telephone number is used as a default telephone number for the calling entry 1400. A subscriber may designate one of the telephone numbers in the calling entry 1400 as a default telephone number by double clicking on the box in column 1407 located to the right of the telephone number. A "D" in the box associated with the telephone number indicates that it is selected as the voice dialing default for a given calling entry 1400. In FIG. 14, it can be seen that the mobile telephone number 301-260-7465 has been selected as the default telephone number to be associated with the name "JOHN DOE" and the nick-name "JOHHNNY D". In such an embodiment, during a voice dialing operation, when a name or nickname is detected in speech but a spoken location is not detected, the default telephone number associated with the detected name or nick-name is used to route the call.

The subscriber can edit the information shown in the columns 1401, 1402, 1403, 1404, 1405, 1406 as desired. Upon completing the modifications to the entry 1312, the user selects the submit updated entry icon 1410 and the revised entry information is transmitted via the Internet to the VD IP 18. As will be discussed in detail below, the VD IP 18 updated the calling record corresponding to the entry as may be required by the user's changes.

While an existing entry 1312 is shown in FIG. 14, a new entry would be displayed in a similar fashion with the information in each of the six columns being blank. The user need not fill in columns 1402, 1404 since speech recognition models for new entries created via the Internet updating process are generated from the text name with columns 1402 and 1404 then being updated VD IP 18 accordingly. The speech recognition model generated from the supplied text name will later be replaced with a voice trained model should recognition accuracy achieved with the speech recognition model generated from text prove unsatisfactory to the subscriber.

Figure 15:
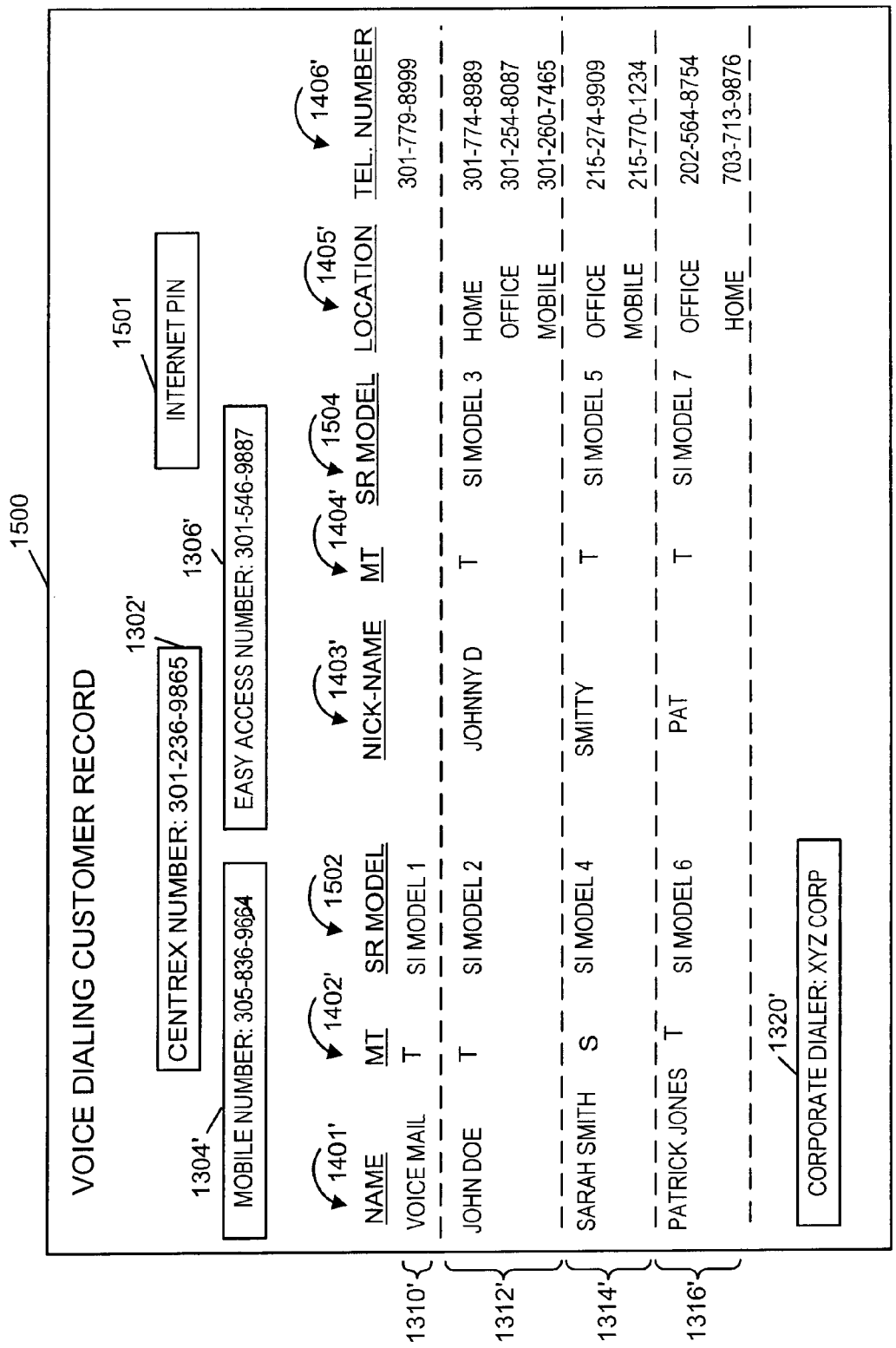
FIG. 15 illustrates an exemplary voice dialing customer record which may be stored in the voice dialing IP illustrated in FIG. 1.

FIG. 15 illustrates an exemplary voice dialing customer record 1500 which is stored by the VD IP 18 for a voice dialing subscriber. The record 1500 may be used as any one of the customer records 88, 90 illustrated in FIG. 3. One voice dialing record 1500 is stored for each subscriber. As illustrated, the record comprises much of the same information that was shown in FIGS. 13 and 14. A ' mark is added to each of the numbers in FIG. 15, which corresponds to previously discussed data shown in FIGS. 13 and 14 to distinguish between the stored data in the record 1500 and the displayed data of FIGS. 13 and 14.

Note that in addition to the data previously discussed with regard to FIGS. 13 and 14, the customer record 1500 includes the subscriber's Internet PIN 1501 and the speech recognition models, SI MODELs 1–7, shown in columns 1502 and 1504. In the illustrated embodiment, one model speaker independent speech recognition model is stored for each name and nickname included in the customer's record.

As discussed above, speech recognition models may be generated from a speech sample provided by the subscriber, e.g., over a voice telephone connection, or from text provided via the Internet. When dialing entries are initially generated from speech, phoneme to text conversion is used to generate a text name corresponding to a generated speech recognition model. In addition, the model type identifier, MT, for the generated model, is set to S indicating the model was generated from speech. Often the text spelling of the name may include errors resulting from the phoneme to text conversion process. In accordance with the present invention, a subscriber can update the text name, via the Internet, without affecting the corresponding speech model. This can be done by modifying the text of the name but leaving the model type identifier set to S. In accordance with the present invention, this results in the text name information being updated, e.g., corrected, with the speech recognition model being left unaltered. Should a subscriber wish to replace a speech recognition model generated from speech with one from text, the subscriber can change the "S" in the model type field to a "TT". This will result in a speech recognition model being generated from the text of the name. The generated model will be stored in place of the previously generated speech recognition model. Thus, when the text of a name is altered, the text entry is updated. However, when there is an exiting speech recognition model which was generated from speech (MT=S) it is replaced only if the user modifies the model type identifier to indicate the model is to be generated from text.

Figure 16:
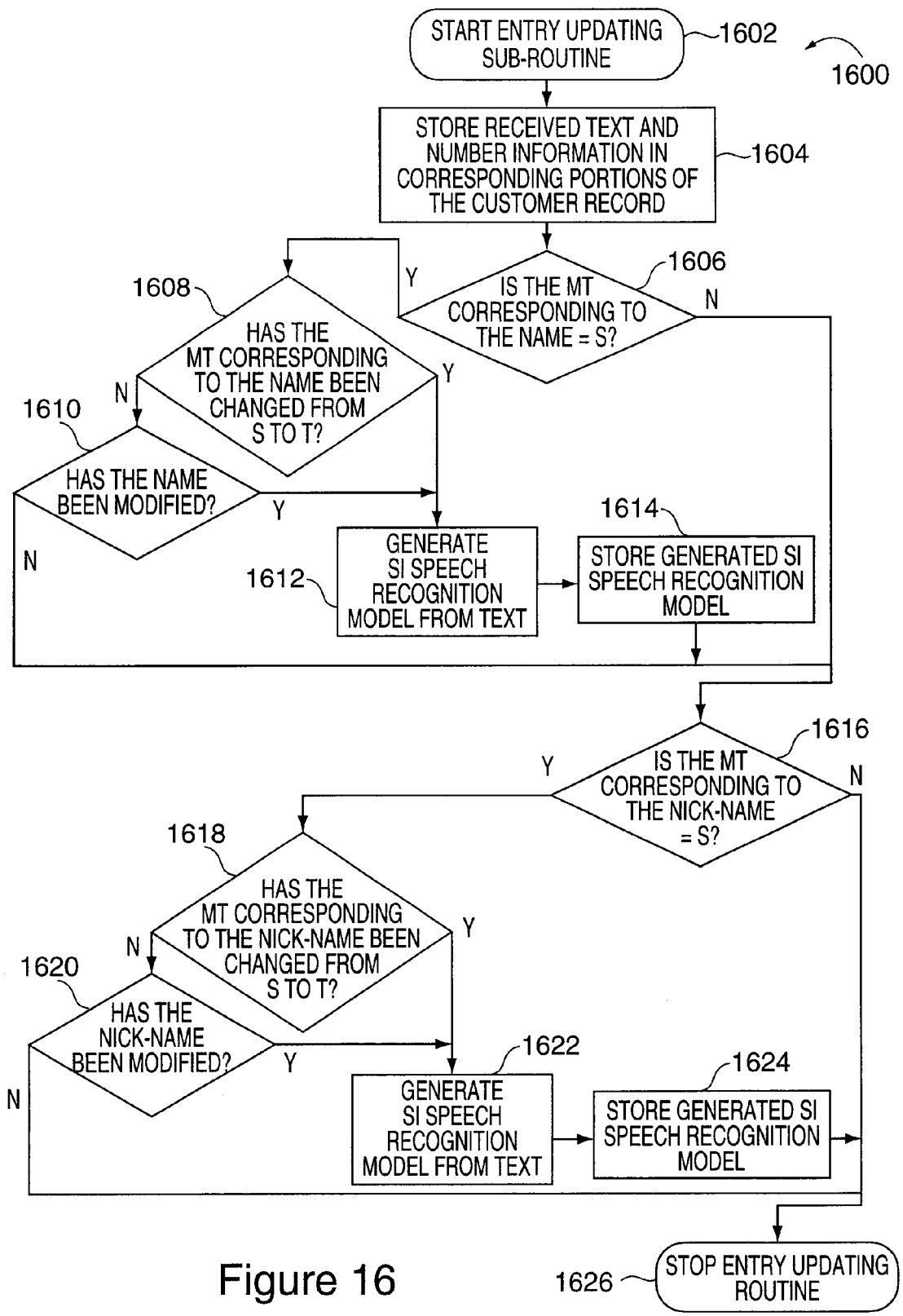
FIG. 16 illustrates a sub-routine used for updating voice dialing entries based on information supplied over the Internet to the voice dialing IP of FIG. 1.

FIG. 16 illustrates voice dialing entry updating sub-routine 1600 which is part of the Internet based personal dialer updating routine 82. The entry updating sub-routine 1600 begins in step 1602 when it is executed by the VD IP 18 in response to receiving updated dialing entry information. From start step 1602 operation proceeds to step 1604, wherein the received text information, e.g., name, nickname, and/or location information, as well as the received number information, e.g., telephone number information, is stored in the portions of the customer record to which the received information corresponds. In this manner, old or missing information is updated with the latest version of the information which the subscriber has submitted.

From step 1604, operation proceeds to step 1606 wherein a determination is made as to whether the model type identifier, MT, associated with the name, is equal to S. That is, in step 1604 a determination is made as to whether a speech recognition model corresponding to the name, has already been generated from speech (as indicated by the presence of the S in the model type field).

If an S exists in the MT field it indicates that the existing speech recognition model is not to be altered and operation proceeds to step 1616.

However, if in step 606, it is determined that the MT field does not equal S, operation proceeds to step 1608. In step 1608, a determination is made as to whether the value in the MT field was changed from S to T indicating that a speech recognition model should now be generated from the text of the name. If the model type field value was changed from S to T operation proceeds to step 1612. Otherwise operation proceeds to step 1610.

In step 1610, a determination is made as to whether the name was modified by the subscriber. This check can be made by comparing the previous value in the name field, i.e., the value supplied to the subscriber's web browser for display, to the value supplied by the web browser to the VD IP 18 as part of the modified entry information. If the name was not modified, updating to the speech recognition model is not required and operation proceeds directly to step 1616. If, however, in step 1610 it is determined that the name was modified, operation proceeds to step 1612.

In step 1612, a speech recognition model is generated from the text of the name, obtained from the subscriber via the Internet. A text to phoneme operation is normally performed as part of the speaker independent model generation process. Text to phoneme information 98 may be used when converting the text information to phoneme information.

After the speaker independent speech recognition model is generated in step 1612, operation proceeds to step 1614 wherein the generated SI speech recognition model is stored in the customer record with the model being associated with the name from which it was generated. As part of the storing operation, a model type value associated with the generated model is set to T if it is not already set to that value, e.g., because a model did not previously exist. Operation proceeds from step 1614 to step 1616.

Steps 1616 though 1624 deal with the updating of the speaker independent speech recognition model corresponding to a nickname. The updating processes is generally the same as that described above with regard to the updating of the speaker independent speech recognition model corresponding to the name.

In step 1616, a determination is made as to whether or not the MT value corresponding to the nickname is set to S. If the MT value is set to S, operation proceeds to step 1626 with the SI speech recognition model corresponding to the nickname being left unaltered.

However, if in step 1616, if it is determined that the MT field does not equal S, operation proceeds to step 1618. In step 1618, a determination is made as to whether the value in the MT field was changed from S to T indicating that a speech recognition model should now be generated from the current text of the nickname. If the model type field value was changed from S to T operation proceeds to step 1622. Otherwise operation proceeds to step 1620.

In step 1620, a determination is made as to whether the name was modified by the subscriber. This check can be made by comparing the previous value in the name field, i.e., the value supplied to the subscriber's web browser for display, to the value supplied by the web browser to the VD IP 18 as part of the modified entry information. If the name was not modified, updating of the speech recognition model is not required and operation proceeds directly to step 1626. If, however, in step 1620 it is determined that the nickname was modified, operation proceeds to step 1622.

In step 1622, a speech recognition model is generated from the text of the nickname obtained from the subscriber via the Internet.

After the speaker independent speech recognition model is generated in step 1622, operation proceeds to step 1624 wherein the generated SI speech recognition model is stored in the customer record with the model being associated with the nickname from which it was generated. As part of the storing operation, a model type value associated with the generated model is set to T if it is not already set to that value, e.g., because a model did not previously exist. Operation proceeds from step 1624 to step 1626.

In step 1626, the entry updating sub-routine is stopped pending its re-execution to processes another set of modified voice dialing entry information.

As discussed above, a voice dialing service subscriber can also update his/her voice dialing record through the use of an ordinary telephone. In such a case, the subscriber calls a telephone number assigned to servicing voice dialing customers. The subscriber is first connected to the Centrex DTMF IP 10 which collects the user's ID, e.g., Centrex telephone number and PIN. After the ISCP 16 validates the subscriber, assuming the subscriber's PIN is correct, the subscriber is connected to the VD IP 18. The phoneme based personal dialer updating routine 84 is invoked, and the subscriber's voice dialing record is retrieved based on the User ID (Centrex telephone number) obtained using ANI information or information provided by the subscriber. The updating routine 84 prompts the subscriber to indicate, e.g., by stating "1" to create a new voice dialing entry or "2" to update an existing voice dialing entry what the subscriber wishes to do. The subscriber may be presented with other options as well.

If the VD IP 18 detects a "1" response either by the use of speech recognition or DTMF detection, the subscriber is prompted for the name of the party to be added to the voice dialing directory. At this point the subscriber states the name and the audio obtained from the subscriber is captured for further processing. The subscriber is also prompted for the telephone number of the party to be added. Location information may also be obtained from the subscriber if multiple telephone numbers are to be entered for the party. Telephone number information is normally entered via DTMF input generated by pressing keys on a telephone keypad. Alternatively the number information can be entered using spoken numbers.

In the case when the VD IP 18 detects a "2" in response to its initial prompt, indicating that an existing calling entry is to be modified, the VD IP 18 prompts the subscriber for the name of the party whose entry is to be modified. At this point the subscriber states the name and the speech obtained from the subscriber is captured for further processing. The subscriber is also prompted for location and telephone number information. The provided telephone number and location information is used to update the telephone number information included in the entry which the speech corresponding to the name is used to create a speech recognition model for the name.

Figure 17:
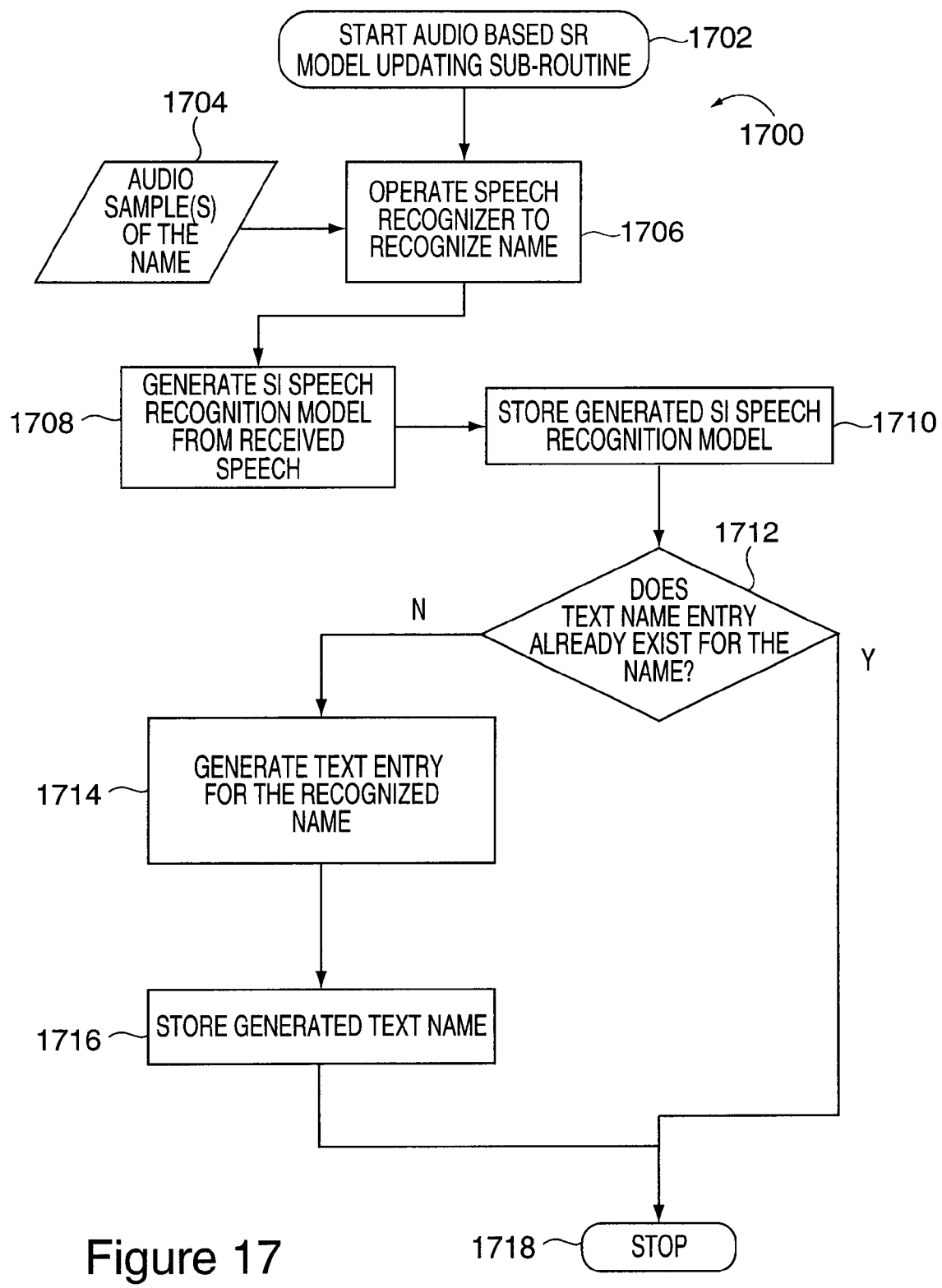
FIG. 17 illustrates a speech recognition model updating sub-routine used to generate speech recognition models corresponding to names from actual speech samples obtained via a telephone connection.

FIG. 17 illustrates an audio based SI model updating sub-routine 1700 which is part of the speech based personal dialer updating routine 84. The sub-routine 1700 is executed, during the entry creation or updating process, once an audio sample of a name has been collected. The sub-routine 1700 starts in step 1702 and proceeds to step 1706. In step 1706 the speech recognizer 104, 106 or 108 is used to process the audio sample 1704 of the name. The dictionary of potential names 99 which includes phonetic information as well as text information may be used by the speech recognizer during this process. In step 1708 a speaker independent model training circuit 105, 107, or 109 is used to generate a speaker independent speech recognition model of the name. The SI speech recognition model may take the form of a phonetic representation of the modeled name. Optionally, a speaker dependent speech recognition training circuit may be used to generate a speaker dependent speech model instead of a speaker independent model. The generated speech recognition model is stored in step 1710 in the entry being created or updated. As part of the storage process, the model type identifier MT, associated with the speech recognition model, is set to "S" indicating that the SI speech recognition model was generated from speech. Once stored, a determination is made in step 1712 as to whether or not a text name entry already exists for the name which was just modeled. In the case where an existing entry is being updated the answer to the inquiry in step 1712 will be yes. In such a case operation proceeds to step 1718.

However, if in step 1712 it is determined that a text name entry corresponding to the generated model does not already exist, operation proceeds to step 1714. In step 1714, a text entry for the recognized name is generated, e.g., from information in the dictionary 99.

Then in step 1716, the generated text name, e.g., text entry, is stored in the subscriber's voice dialing record in a manner that associates the text name with the generated SI speech recognition model. From step 1716 operation proceeds to step 1718 wherein the updating sub-routine 1700 is stopped.

In the above described manner, a new voice dialing entry can be created from a spoken name with the text name and the speech recognition model included in the entry being generated from the same audio sample, e.g., through the use of speech recognition and speech recognition model training techniques, respectively. In addition, speech recognition models of names which were originally generated from text, can be replaced with speech recognition models generated from spoken utterances.

Accordingly, subscriber's can take advantage of the ease of creating voice dialing entries via the Internet and the use of speech recognition models generated from text, while still being able to train speech recognition models via audio samples in cases where the recognition models generated from text provide unsatisfactory recognition results.

Having discussed the creation and maintenance of a subscriber's voice dialing record in detail, use of the record and the voice dialing IP 18 to place one or more telephone calls will now be discussed.

Figure 18:
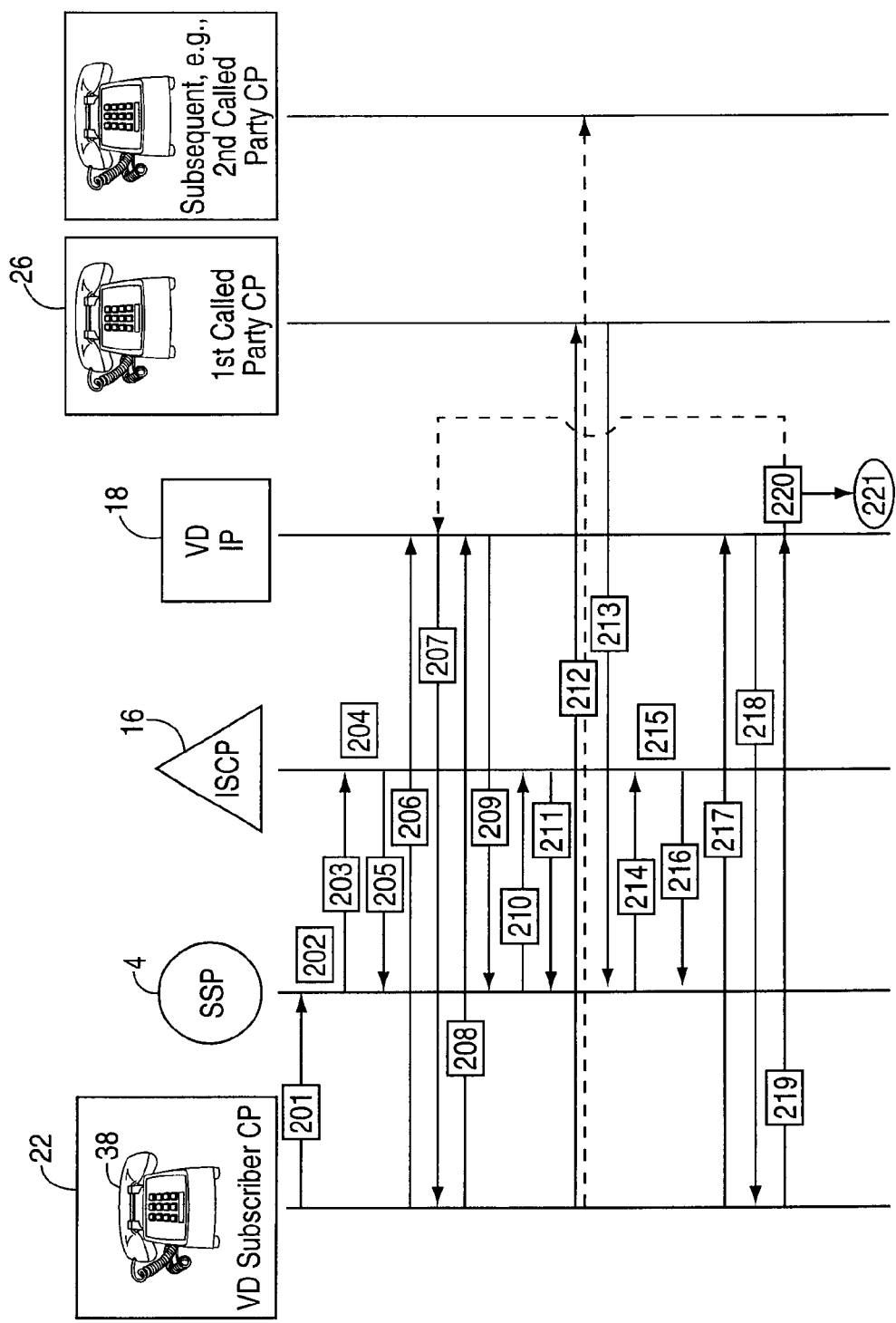
FIGS. 18–20 are call flow diagrams which illustrate the steps, in addition to the data, instruction and message flow, associated with making one or more voice dialing calls in accordance with the present invention.
Figure 19:
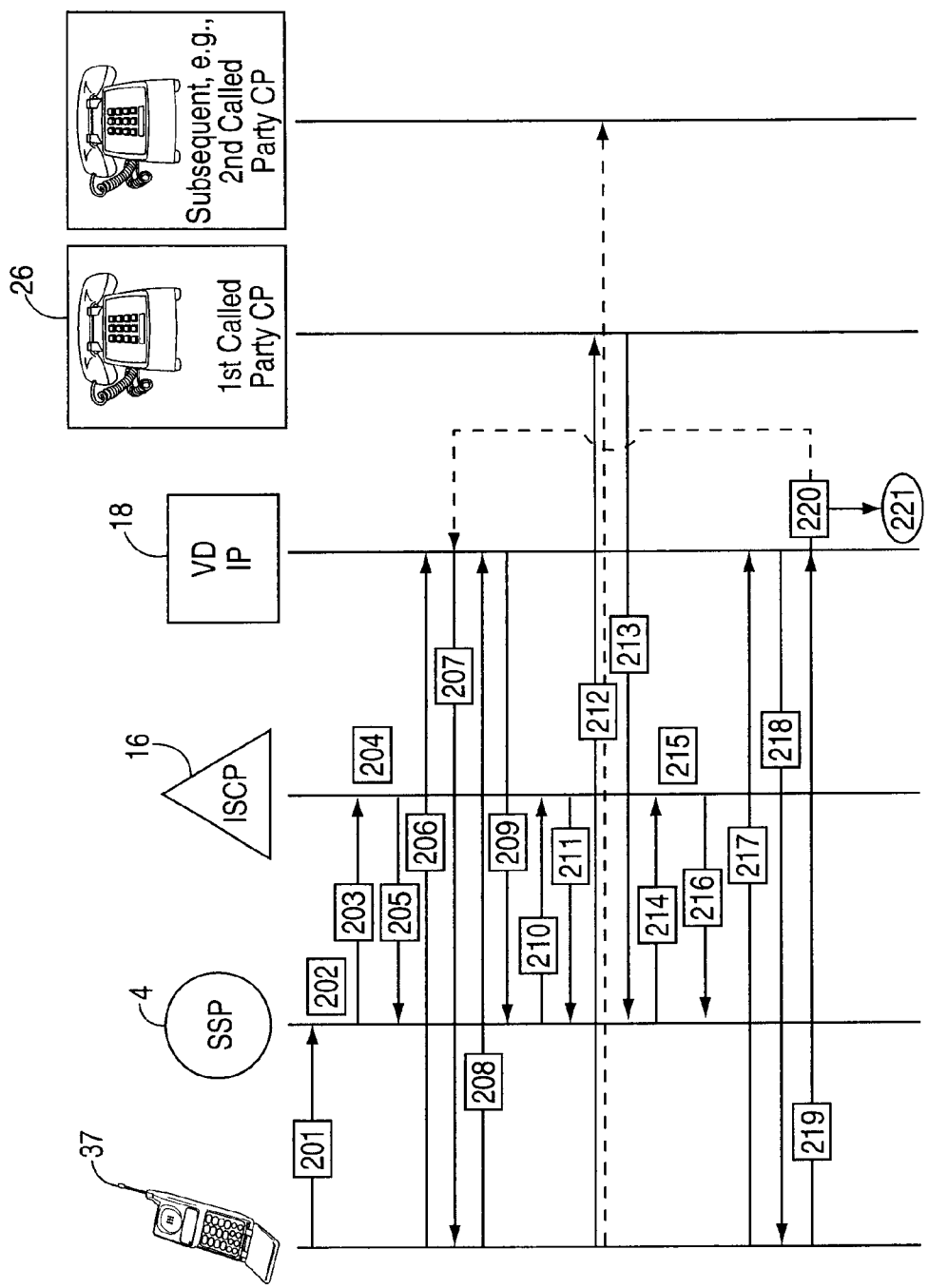
Figure 20:
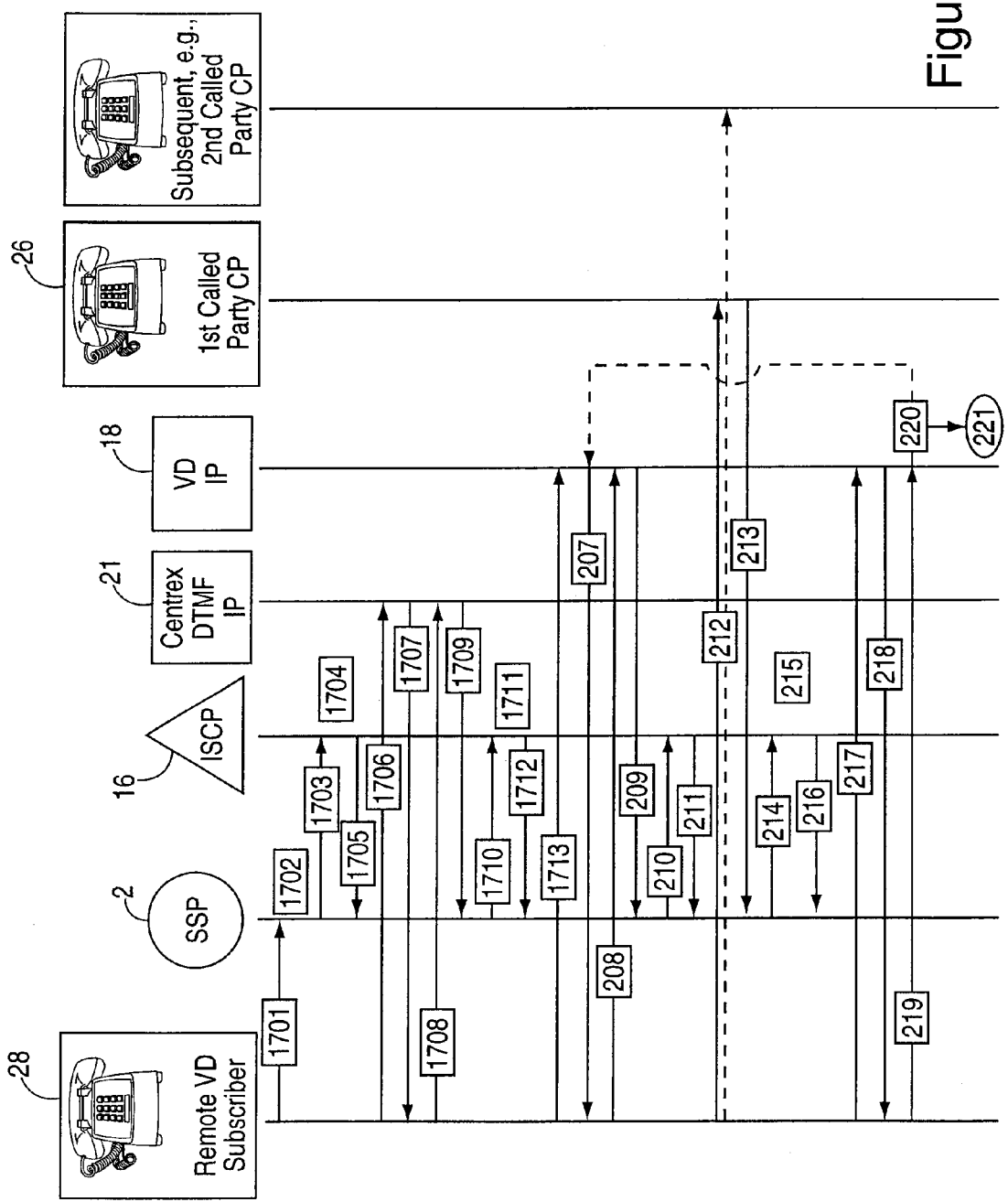

FIGS. 18–20 are call flow diagrams. The diagrams illustrate processed steps and the transfer of messages, data, and other signals between components of the system 100, which occur as part of various Centrex 10 supported voice dialing operations. The top row in each of FIGS. 18–20 illustrate system components which are involved in placing a call using the voice dialing service of the present invention. In FIGS. 18–20 boxes in rows, other than the top row of FIGS. 15–18, represent steps while arrows are used in FIGS. 15–18 to represent the transfer of signals, data, and/or messages between system components.

FIG. 18 illustrates a basic voice dialing call implemented from a Centrex subscriber's telephone line which has been provisioned for voice dialing service. For purposes of explanation, it will be assumed that the call is placed by the first subscriber from the first subscriber premises 22 using landline phone 38.

The process of placing a call illustrated in FIG. 18, begins in step 201, with the first subscriber picking up the telephone 38 and dialing *0, indicating a request for a voice dialing operation. As part of the provisioning of voice dialing service for the first subscriber, a CDP (customized dialing plan) feature code trigger was set at the SSP 4 to which the first subscriber's phone is connected. While a CDP feature code trigger is used for Centrex subscribers, a vertical access code trigger is used to provide voice dialing services to non-Centrex subscribers, e.g., ordinary residential telephone customers. For purposes of explanation, voice dialing will be explained assuming use of a CDP feature code trigger with the understanding that the same or similar processing would occur in response to activation of a vertical access code trigger, used to provide non-Centrex subscribers with voice dialing service in accordance with the present invention.

In step 202, the CDP feature code trigger set at SSP 4 on the first subscriber's line is hit and call processing is paused. Then, in response to activation of the trigger, the SSP 4 launches, in step 203, a query for call processing instructions to the ISCP 16. The query includes a user ID corresponding to the first subscriber.

In step 204, the ISCP 16 uses service key analysis on the USER ID, included in the received query, and opens the CPR corresponding to the indicated user, i.e., the first subscriber. In accordance with the present invention, the USER ID may be, e.g., the subscriber's Centrex telephone number. Since the feature code trigger *0 triggered the query, the ISCP 16 knows from the query that the subscriber is trying to initiate a voice dialing operation. The opened CPR instructs the ISCP to send a Send To Outside Resource (STOR) command to the SSP instructing the SSP to send the call to a specific IP address, where the address is that of the voice dialing IP 18 which services the first subscriber. The address of the voice dialing IP 18 assigned to service a particular customer is stored as part of the first subscribers CPR.

In step 205, the STOR message with the VD IP address is transmitted to the SSP 4. Included in the STOR message is a play PROMPT 1 instruction. Where PROMPT 1 is an audio prompt which requests the name to be dialed.

In response to the STOR message, in step 206, the SSP 4 sets up an ISUP connection to the VD IP 18 specified by the received IP address and passes the IP the play PROMPT 1 instruction. At this point the caller is now connected to the voice dialing IP 18. The VD IP may be local or remote to the SSP 4, i.e., the SSP 4 may use a voice dialing platform coupled to a different SSP.

In step 207, the VD IP 18 recognizes, e.g., based on the USER ID, the subscriber just connected to the VD IP 18 and retrieves their voice dialing information, e.g., personal dialing directory information including speaker independent speech recognition models and telephone numbers corresponding to modeled names. Once the IP 18 is ready to perform a voice dialing operation, as part of step 207, the VD IP 18 retrieves PROMPT 1 from its memory and plays PROMPT 1. PROMPT 1 is a message to the subscriber which tells the subscriber: "State the name of the person you wish to dial".

In step 208, the user speaks the name of the person they wish to call and the audio signal is supplied to the VD IP 18 for analysis.

Assuming the VD IP 18 recognizes the name spoken by the caller, in step 209, the IP returns the called party's ID, e.g., telephone number, to the SSP 4 which then terminates the connection to the IP 18. Optionally, in step 209, prior to returning the telephone number, the IP may play the subscriber a confirmation message indicating the name of the party being called. In one embodiment, the text of the recognized name if processed by TTS device 105 to generate an audio version of the recognized name which is played to the subscriber. Operation proceeds from step 209 to step 210, wherein the SSP 4 returns the called party ID (telephone number) to the ISCP.

In response to receiving the called party's telephone number from the SSP, in step 211, the ISCP 16 sends a Forward Call Response message with the called party's telephone number. The ISCP also sends an O-Busy, an O-NoAnswer NEL to the SSP which will cause the SSP to signal the ISCP if a busy or no answer condition is detected on the called party's line.

In step 212, the SSP 4 routes the call to the called party's number in an attempt to connect the caller 22 with the first called party 26. In step 213, the SSP 4 detects whether the called party answered or if there is a busy, or no answer condition on the called party's line. If the call is answered, the call is allowed to terminate in a normal manner and the ISCP has no further involvement in the call.

However, in accordance with one feature of the present invention, if no answer is detected or a busy signal is detected on the called party's line, call processing continues in step 214 with the SSP sending a NEL message back to the ISCP 16 along with calling party and/or call identification information.

In response to the message from the SSP 4, in step 215, the ISCP prepares a second STOR message to be sent to the SSP 4. This time the STOR message includes a Play APP 3 instruction if a busy signal was detected and a Play APP 4 instruction if a no answer condition was detected. The Play App 3 instruction causes the VD IP 18 to play a message indicating that the called number is busy and asking the caller if they want to place another call. It also causes the VD IP 18 to monitor for a response from the caller. The Play APP 4 message causes the VD IP 18 to play a message indicating that there is no answer on the called line and asking the caller if they want to place another call. The Play App 3 and 4 instructions also cause the VD IP 18 to monitor for a response from the caller to the message.

In step 216, the STOR message and corresponding Play App message is sent by the ISCP 16 to the SSP 4. In step 217 an ISUP message which includes the received PLAY APP information is sent to the VD IP 18 and the caller is once again connected to the VD IP 18.

In step 218, the VD IP-18 plays the message corresponding to the PLAY APP message received from the SSP 4. In an exemplary embodiment, in the case of PLAY APP2, the caller is played the message: "The number you are attempting to call is busy, would you like to place another call?". In the same exemplary embodiment, in the case of PLAY APP 4, the caller is played the message "There is no answer at the number you are trying to call, would you like to place another call?".

In step 219, the caller responds to the message prompt with a "Yes", "No" or by hanging up.

In step 220, the VD IP 18 detects the caller's response. If the caller hangs up or replies with a "No", the call is terminated in step 221 in the normal manner, i.e., the VD IP 18 and ISCP 16 closes records and/or transactions associated with the call and releases resources dedicated to servicing the call. However, if in step 220, the VD IP 18 detects a "Yes" from the caller operation proceeds once again to step 207 thereby providing the caller the opportunity to call a subsequent, e.g., $2^{nd}$, party.

The dotted line associated with step 212 is used to indicate the contacting of a subsequent called party as a result of the additional opportunity or opportunities provided to a caller to place a voice dialing call.

The process of providing the caller the opportunity to call additional parties through the use of voice dialing may be repeated multiple times, e.g., until a called party answers, the caller hangs up terminating the call, or the caller indicates in step 219 that he/she does not wish to make an additional voice dialing call.

In addition to providing the caller the opportunity to call a subsequent party when the first called party is busy or does not answer, the present invention can be used to provide a caller the opportunity to place one or more calls via voice dialing after an initial voice dialing call is successfully completed to a called party.

In one such embodiment, when the voice dialing subscriber completes a voice dialing call to a called party, the termination of the call, e.g., by the called party hanging up is detected by the SSP 4. The detection of the called party hanging up is achieved through the use of an AIN mid-call trigger set on the subscriber's, e.g., calling party's, line. Activation of the mid-call trigger causes the SSP 4 to launch another message to the ISCP 16. In response to the message, the ISCP 16 sends a STOR instruction and PLAY APP 5 message to the SSP 4. After being connected once again to the VD IP 18, the caller is played a message inquiring whether or not the caller wants to place another call. The message may be, e.g. "Would you like to place another Voice Dialing call?". Operation then proceeds, in such an embodiment, as previously discussed in regard to step 220, with the caller's response being detected and the caller being reconnected to the voice dialing IP 18 if the response was in the affirmative.

In accordance with the present invention, when a calling party hangs up, the SSP 4 sends a message to the ISCP 16 causing the ISCP 16 to close the subscriber's CPR and completing the call transaction.

The method of providing a voice dialing service subscriber the opportunity to call additional parties without having to hang up and initiate an entirely new call, has been described in the context of a caller placing a call from a landline phone designated as corresponding to a Centrex customer who subscribes to a voice dialing service. However, it should be noted that the voice dialing service can also be provided to callers using mobile phones and land line phones other than their assigned Centrex phone.

In accordance with one Centrex embodiment, Centrex customers are allowed to designate a telephone number, other than their landline Centrex telephone number, as a Centrex mobile and/or Centrex easy access telephone number. The mobile and/or easy access telephone numbers associated with a Centrex subscriber are stored as part of the subscriber's CPR in the ISCP 16. In accordance with the present invention, a subscriber can access his/her Centrex service, e.g., voice dialing service, by dialing the telephone number associated with the subscriber's landline phone.

The call to the subscriber's landline phone activates a terminating attempt trigger (TAT) set on the subscriber's line. In response to activation of the TAT trigger, the SCP 4 generates a request for call processing instructions which is sent to the ISCP 16 associated with the subscriber. The request includes subscriber identification information, e.g., the subscriber's landline phone number, and calling party identification information, e.g., the calling parties telephone number obtained using e.g., using automatic number identification (ANI) information. The ISCP 16 accesses the CPR corresponding to the identified subscriber and determines if the call is from the subscriber's mobile or easy access number, if it is, voice dialing service is provided in the same manner as in the case where the subscriber call's from his/her Centrex landline phone.

Provision of a voice dialing service to a subscriber calling from a mobile phone is illustrated in FIG. 19. As illustrated, the process begins in step 201' with the subscriber calling his Centrex landline phone number from mobile phone 37. The call is routed to the SSP 4 which is coupled to the subscriber's Centrex landline phone.

In step 202' a terminating attempt trigger set on the subscriber's line is activated as a result of the call at the SSP 4 and call processing is paused. In step 203' a query is launched to the ISCP 16 for call processing instructions. As discussed above, the query includes calling party identification information, e.g., the telephone number of mobile phone 37, and user (called) party, e.g., Centrex subscriber, identification information e.g., in the form of the called telephone number. In step 204', using the user ID information, e.g., called telephone number, the ISCP 16 opens the CPR corresponding to the called subscriber and generates a STOR message to the IP address assigned in the CPR to provide voice dialing service. A PLAY APP1 message, e.g., instruction to provide a voice dialing prompt, is sent, in step 205', along with the STOR message, to the SSP 4. To insure that the VD IP 18 to which the STOR message instructs the SSP to connect the call will be able to retrieve the subscriber's voice dialing record, the calling party ID included with the STOR message is the subscriber's Centrex landline telephone number. In this manner the VD ID 18 is provided with the same calling party ID whether the originating call is from the subscriber's Centrex landline phone, mobile phone or another, e.g., landline, phone designated as an easy access number.

Once connected to the voice dialing IP 18, the voice dialing operation proceeds as previously described in regard to FIG. 18, starting with step 206.

Provision of voice dialing services to subscribers who are located at remote locations, without access to their remote phone or a phone which has been designated as an easy access phone, are also contemplated. In one such embodiment, access to an individual subscriber is provided by having the subscriber call a telephone number designated for the purpose of providing voice dialing service to remote Centrex subscribers. Different telephone numbers may be designated for providing voice dialing services to different companies. Thus, it is contemplated that the telephone number called for voice dialing may be, e.g., an 800 telephone number designated for use in providing employee's of an individual company access to the voice dialing service which is provided as part of the Centrex service to which the company subscribes. The 800 number is provisioned, at the SSP which is responsible for servicing calls directed to the 800 number, with a terminating attempt trigger. In addition, a call processing record is stored in the ISCP 16 for the 800 number. The call processing record includes information identifying a CENTREX DTMF IP 21 to be used for providing security in regard to calls from remote Centrex Subscribers.

The steps and signal flows associated with a remote voice dialing service subscriber obtaining voice dialing service are shown in FIG. 20.

As illustrated, the process of a remote VD subscriber placing a voice dialing call begins in step 1701 wherein the remote VD subscriber calls the telephone number, e.g., 800 number, assigned for use in providing voice dialing service to remote subscribers. The call from the remote location, e.g., customer premises 28, is routed by the telephone network to SSP 2 which is the terminating SSP for the called number. In step 1702, the terminating attempt trigger set on the called number as SSP 2 is hit and call processing is paused while a query requesting call processing instruction is prepared.

In step 1703 a query for call processing instructions is launched to the ISCP 16. The query includes a user ID indicating the called number which is designated for servicing remote voice dialing subscribers.

Using service key analysis on the USER ID included in the query, the ISCP 16, in step 1704, opens the CPR associated with the called voice dialing service number. The ISCP then generates a STOR message with a PLAY APP 2 instruction and an IP address corresponding to the address of Centrex DTMF IP 21. A Play APP 2 message prompts a caller for a Centrex ID and a PIN.

In step 1705, the generated STOP message with the address of DTMF IP 21 and the PLAY APP 2 instruction is sent to the SSP 2. In step 1706, the SSP 2 in response to the STOR instruction, connects the caller to the CENTREX DTMF IP 21. The connection may be local or remote to the SSP 2.

In step 1707, the IP 21 plays prompts to the caller by playing a PLAY APP 2 messages such as: "Please enter your Centrex telephone number followed by your PIN."

In response to the prompt, in step 1708, the caller supplies the caller's Centrex telephone number, e.g., the telephone number of phone 38, assuming the remote caller is the first subscriber and a PIN. The input may be in the form of spoken numbers or DTMF input. In step 1709 the IP 21 converts the spoken and/or DTMF signals into the corresponding numeric values and supplies the information, e.g., Centrex phone number and PIN to the SSP 2. The SSP 2, in step 1710 then forwards the ID and PIN information to the ISCP 16.

In step 1711, the ISCP 16, accesses the CPR corresponding to the Centrex phone number provided, compares the PIN in the CPR to received PIN. If the stored and received PINs match, the ISCP identifies the address of the VD IP 18 assigned to service the customer and formulates a STOR message with a PLAY APP 1 instruction and the address of the VD IP 18. However, if the ISCP 18 determines the PIN's do not match after three attempts, the ISCP 18 instructs the SSP 2 to terminate the call, e.g., after using the IP 10 to provide the caller with an error message. The transfer of the STOR message or instruction to terminate the call connection generated in step 1711 is transmitted to the SSP 2 in step 1712.

Assuming the caller was validated by the ISCP 16, in step 1713 the caller is coupled, by the SSP 2 to the voice dialing IP 18 indicated by the address included in the STOR message. The User ID provided to the VD IP 18, when establishing the connection with the caller is the Centrex ID, e.g., subscriber's Centrex telephone number. The VD IP 18 may be local or remote to the SSP 2 i.e., the SSP 2 may use a voice dialing platform coupled to a different SSP, e.g., SSP4. Since the User ID provided to the VD IP 18 is the same as the ID which would have been provided if the subscriber was calling from his/her Centrex phone, the VD IP 18 can access the subscriber's voice dialing information using the same identifier regardless of how the subscriber is connected to the VD IP 18. Thus, the VD IP 18 can service the voice dialing call from the remote user in generally the same manner as a call from the subscriber's Centrex telephone line. Accordingly, call processing in the FIG. 20 embodiment proceeds from step 1713 to step 207.

In step 207, the VD IP 18 recognizes, e.g., based on the USER ID, the subscriber just connected to the VD IP 18 and retrieves the subscriber's voice dialing information, e.g., personal dialing directory information. The retrieved information includes speaker independent speech recognition models of names and telephone numbers corresponding to the modeled names. Once the IP 18 is ready to perform a voice dialing operation, as part of step 207, the VD IP 18 retrieves PROMPT 1 from its memory and plays PROMPT 1 to the subscriber. Prompt 1 is a message which tells the subscriber: "State the name of the person you wish to dial".

From step 207, the call is ultimately completed as discussed previously in regard to the FIG. 18 example, e.g., by following steps 209 through 221 as may be dictated by received input and/or called party availability.

In the above described manner, a Centrex subscriber can initiate a voice dialing operation from a specific phone line, e.g., a phone line provisioned with Centrex service, a mobile phone, a phone corresponding to an "easy access number", or a remote phone with which Centrex or voice dialing service information has not been associated in records maintained by the ISCP 16.

It should be noted that the FIG. 20 call flow assumes that separate IP's are used for security and voice dialing functions. These functions could, if desired, be implemented using the same IP.

Speech recognition models for names have been described as part of a subscriber's voice dialing record. The generation and storage of these speech recognition models, prior to having to perform a speech recognition operation, reduces the amount of processing which must be performed at speech recognition time. However, since the text information from which name models are generated are stored in the customer record, it is possible to avoid the storage of these models and, instead, generate them when needed from the text information included in a subscriber's voice dialing record.

Numerous variations on the above described methods and apparatus are possible without departing from the scope of the invention.

What is claimed is:

1. A voice dialing method, comprising:
   generating a first speech recognition model from text corresponding to a first name, the first speech recognition model being a speaker independent speech recognition model;
   storing the first speaker independent speech recognition model and a first telephone number associated with the first name in a voice dialing record;
   generating a second speech recognition model corresponding to a second name, the second speech recognition model being generated from speech including the second name, the step of generating a second speech recognition model including:
   i) transmitting said speech, including the second name, over a telephone network to a speaker independent speech recognition model training circuit;
   ii) operating the speaker independent speech recognition model training circuit to generate the second speech recognition model; and
   iii) storing the second speech recognition model in said voice dialing record.

2. The method of claim 1, further comprising:
   storing a second telephone number associated with the second name in said voice dialing record.

3. The method of claim 2, further comprising:
   receiving speech from a caller;
   using the first and second speech recognition models to perform a speech recognition operation on the received speech; and
   when one of the first and second names is recognized in the received speech, placing a call to the telephone number associated with the recognized one of the first and second names.

4. The method of claim 3, further comprising:
   storing information in the voice dialing record indicating that the second speech recognition model was generated from speech.

5. The method of claim 4, wherein the second speech recognition model is a speaker independent speech recognition model.

6. The method of claim 3, wherein the second speech recognition model is a speaker dependent speech recognition model.

7. The method of claim 1, further comprising:
   storing information in the voice dialing record indicating that the second speech recognition model was generated from speech.

8. The method of claim 7, wherein the second speech recognition model is a speaker independent speech recognition model.

9. The method of claim 1, further comprising the step of:
   operating a speech to text conversion device to generate a text version of said second name from said speech including the second name; and
   storing the text version of the second name in the calling record.

10. The method of claim 9, further comprising the step of:
    transmitting the text version of the second name to a subscriber's computer via the Internet.

11. The method of claim in 10, further comprising the step of:
    receiving, via the Internet, a modified text version of the second name; and
    storing the modified text version of the second name in the voice dialing record.

12. The method 11, further comprising:
    operating an intelligent peripheral device coupled to a telephone switch to receive additional speech from a caller;
    using the first and second speech recognition models to perform a speech recognition operation on the received additional speech; and
    when one of the first and second names is recognized in the received speech, placing supplying the telephone switch with the telephone number associated with the recognized one of the first and second names.

13. A method of providing a voice dialing service, the method comprising the steps of:
    receiving speech from a voice dialing service subscriber including a first name;

processing the received speech to generate a first speech recognition model corresponding to the first name;

performing a speech to text operation on the received speech to generate a text version of the first name;

storing the generated speech recognition model and the text version of the first name in a voice dialing record;

presenting the text version of the first name to a voice dialing service subscriber;

receiving a modified version of the first name; and storing the modified version of the first name in the voice dialing record.

14. The method of claim 13, wherein the step of presenting the text version of the first name includes the step of;

transmitting the text version of the first name over the Internet to a computer system; and operating the computer system to display the text version of the first name.

15. The method of claim 14, further comprising:

receiving from the computer system telephone numbers and text versions of additional names transmitted over the Internet, at least one telephone number being associated with the text version of each additional name.

16. The method of claim 15, further comprising:

generating from the text version of each received additional name, a speaker independent speech recognition model;

storing in the voice dialing record, the text of each additional name, the at least one received telephone number associated with each additional name, and the generated speaker independent speech recognition models.

17. The method of claim 16, further comprising the step of:

storing in the voice dialing record a first model type identifier associated with the first speech recognition model, the model type identifier indicating that the first speech recognition model was generated from speech.

18. The method of claim 17, further comprising the step of:

storing in the voice dialing record a second model type identifier associated with the speaker independent speech recognition models generated from the text of each additional name, the second model type identifier indicating that the speaker independent speech recognition models with which it is associated were generated from text.

19. The method of claim 18, further comprising;

receiving speech from a caller;

using the speech recognition models stored in said voice dialing record to perform a speech recognition operation on the received speech; and when a name is recognized in said speech using the stored speech recognition models, placing a call to the telephone number associated with the recognized one of the names.

20. A voice dialing system, comprising:

a telephone network;

an intelligent peripheral device coupled to the telephone switch and to a data network for receiving audio signals from the telephone switch and for receiving data including text via the data network, the intelligent peripheral device including:

first means for generating speech recognition models of names from text versions of names received via the data network; and second means for generating speech recognition models of names from speech received from the telephone switch.

21. The voice dialing system of claim 20, further comprising:

means for performing a speech recognition operation on speech received from a caller using at least one speech recognition model generated by one of said first and second means for generating speech recognition models to identify a name in the received speech; and means for supplying a telephone number corresponding to a recognized name to the telephone switch.

22. The voice dialing system of claim 21, further comprising:

a data storage device for storing speech recognition models generated by said first and second means for generating speech recognition models and for storing at least one telephone number associated with each speech recognition model.

23. The voice dialing system of claim 21, wherein the data network to which the intelligent peripheral device is coupled is the Internet.

24. The voice dialing system of claim 23, wherein the first means for generating speech recognition models includes a text to phoneme converter.

25. The voice dialing system of claim 20, further comprising:

a speech to text device for generating text versions of names from speech which is processed by the second means for generating speech recognition models to generate a speech recognition model there from.

26. A voice dialing system, comprising:

a subscriber record including:
  a first set of speech recognition models generated from text versions of names;
  a second set of speech recognition models generated from spoken versions of names provided by said subscriber, wherein the first and second sets of speech recognition models include speaker independent speech recognition models;

means for performing a speech recognition operation on speech using the first and second sets of speech recognition models; and means for supplying a telephone number associated with a recognized name to a telephone switch;

wherein said subscriber record further includes:
  i) text versions of names generated from speech by a speech to text operation, one of said text versions of names being associated with each of the models in the second set of speech recognition models; and
  ii) a model type identifier associated with each one of the models in the first and second sets of models, the model type identifier associated with a speech recognition model indicating whether the model was generated from speech or from text.

27. A voice dialing system, comprising:

a subscriber record including:
  a set of first speech recognition models generated from text versions of names;
  a second set of speech recognition models generated from spoken versions of names provided by said subscriber;

means for performing a speech recognition operation on speech using the first and second sets of speech recognition models;

means for supplying a telephone number associated with a recognized name to a telephone switch; and an integrated service control point for storing call processing records, said call processing records including information identifying voice dialing circuitry in which said subscriber record is stored.

28. The voice dialing system of claim 27, wherein the integrated service control point includes information used to provide a plurality of Centrex services, one of said Centrex services being a voice dialing service.

* * * * *

UNITED STATES PATENT AND TRADEMARK OFFICE
CERTIFICATE OF CORRECTION

PATENT NO. : 6,690,772 B1
DATED : February 10, 2004
INVENTOR(S) : Jayant M. Naik et al.

It is certified that error appears in the above-identified patent and that said Letters Patent is hereby corrected as shown below:

Title page,
Item [75], Inventors, replace "Scott Alexander McAlily" with -- Scott Alexander McAliley --.

Signed and Sealed this

Eighteenth Day of January, 2005

JON W. DUDAS
*Director of the United States Patent and Trademark Office*